(12) United States Patent
Lankalapalli et al.

(10) Patent No.: US 7,933,677 B2
(45) Date of Patent: Apr. 26, 2011

(54) SYSTEM AND METHOD FOR SURFACE FINISH MANAGEMENT

(75) Inventors: Kishore Lankalapalli, Westfield, IN (US); Robert J Gorgol, Jr., Indianapolis, IN (US); Yongxing Hao, Carmel, IN (US); Song Liu, Carmel, IN (US); Judith W Miller, Carmel, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 808 days.

(21) Appl. No.: 11/830,429

(22) Filed: Jul. 30, 2007

(65) Prior Publication Data

US 2008/0033591 A1  Feb. 7, 2008

Related U.S. Application Data

(60) Provisional application No. 60/821,513, filed on Aug. 4, 2006.

(51) Int. Cl.
*G06F 19/00* (2006.01)

(52) U.S. Cl. .................... 700/172; 700/179; 700/180

(58) Field of Classification Search .................. 700/159, 700/160, 169, 172, 173, 174, 175, 176, 179, 700/180, 182, 184, 185, 186, 189
See application file for complete search history.

(56) References Cited

U.S. PATENT DOCUMENTS

| | | | |
|---|---|---|---|
| 3,576,979 A | 5/1971 | McCall et al. |
| 3,602,090 A | 8/1971 | Whetham |
| 3,679,955 A | 7/1972 | Rhoades |
| 3,728,595 A | 4/1973 | Adams |
| 3,838,258 A | 9/1974 | Logan |
| 3,849,712 A | 11/1974 | Lankford et al. |
| 3,860,805 A | 1/1975 | Strukel |
| 3,882,304 A | 5/1975 | Walters |
| 4,130,788 A | 12/1978 | Fiegehen et al. |
| 4,131,837 A | 12/1978 | Whetham |
| 4,208,718 A | 6/1980 | Chung |
| 4,415,867 A | 11/1983 | Rubin |
| 4,433,382 A | 2/1984 | Cunningham et al. |
| 4,477,754 A | 10/1984 | Roch |
| 4,490,781 A | 12/1984 | Kishi et al. |
| 4,501,998 A | 2/1985 | Nozawa et al. |
| 4,542,471 A | 9/1985 | Inaba et al. |
| 4,543,625 A | 9/1985 | Nozawa et al. |

(Continued)

FOREIGN PATENT DOCUMENTS

CN        1155111 A    7/1997

(Continued)

OTHER PUBLICATIONS

International Preliminary Report on Patentability from the International Searching Authority for PCT/US2007/075003, 20 pages.

(Continued)

*Primary Examiner* — Charles R Kasenge
(74) *Attorney, Agent, or Firm* — Baker & Daniels LLP

(57) ABSTRACT

The present disclosure relates to a motion control system for a machine tool system wherein a value of a surface finish quality parameter of the motion control system is adjusted to control the surface finish of a part machined with the machine tool system. The machine tool system may include a conversational mode of operation and a NC mode of operation.

41 Claims, 15 Drawing Sheets

U.S. PATENT DOCUMENTS

| | | |
|---|---|---|
| 4,571,686 A | 2/1986 | Torisawa |
| 4,590,573 A | 5/1986 | Hahn |
| 4,616,326 A | 10/1986 | Meier et al. |
| 4,626,756 A | 12/1986 | Inaba et al. |
| 4,635,206 A | 1/1987 | Bhatia et al. |
| 4,723,203 A | 2/1988 | Kishi et al. |
| 4,728,872 A | 3/1988 | Kishi et al. |
| 4,739,488 A | 4/1988 | Asakura |
| 4,750,105 A | 6/1988 | Ohkawa et al. |
| 4,763,276 A | 8/1988 | Perreirra et al. |
| 4,797,825 A | 1/1989 | Shimanuki et al. |
| 4,833,617 A | 5/1989 | Wang |
| 4,835,710 A | 5/1989 | Schnelle et al. |
| 4,878,172 A | 10/1989 | Matsumura |
| 4,884,373 A | 12/1989 | Suzuki et al. |
| 4,901,220 A | 2/1990 | Matsumura et al. |
| 4,908,555 A | 3/1990 | Ikeda et al. |
| 4,926,311 A | 5/1990 | Matsumura et al. |
| 4,959,597 A | 9/1990 | Kawamura et al. |
| 4,963,805 A | 10/1990 | Suzuki et al. |
| 4,973,895 A | 11/1990 | Torii et al. |
| 5,028,855 A | 7/1991 | Distler et al. |
| 5,031,107 A * | 7/1991 | Suzuki et al. ................ 700/186 |
| 5,060,164 A | 10/1991 | Yoneda et al. |
| 5,062,755 A | 11/1991 | Lawrence et al. |
| 5,089,950 A | 2/1992 | Miyata et al. |
| 5,091,861 A | 2/1992 | Geller et al. |
| 5,117,169 A | 5/1992 | Kakino et al. |
| 5,134,570 A | 7/1992 | Nankaku |
| 5,177,421 A | 1/1993 | Sasaki et al. |
| 5,179,514 A | 1/1993 | Rastegar et al. |
| 5,198,984 A | 3/1993 | Yamaguchi et al. |
| 5,247,447 A | 9/1993 | Korncoff et al. |
| 5,287,049 A | 2/1994 | Olomski et al. |
| 5,288,209 A | 2/1994 | Therrien et al. |
| 5,334,918 A | 8/1994 | McMurtry et al. |
| 5,339,249 A | 8/1994 | Schaeffer |
| 5,369,592 A | 11/1994 | Honda |
| 5,375,064 A | 12/1994 | Bollinger |
| 5,378,091 A | 1/1995 | Nakamura |
| 5,378,218 A | 1/1995 | Daimaru et al. |
| 5,402,367 A | 3/1995 | Sullivan et al. |
| 5,453,933 A | 9/1995 | Wright et al. |
| 5,471,395 A | 11/1995 | Brien |
| 5,473,532 A | 12/1995 | Unno et al. |
| 5,493,502 A | 2/1996 | Niwa |
| 5,508,596 A | 4/1996 | Olsen |
| 5,544,046 A | 8/1996 | Niwa |
| 5,548,195 A | 8/1996 | Doran |
| 5,604,677 A | 2/1997 | Brien |
| 5,668,459 A | 9/1997 | Kim |
| 5,682,319 A | 10/1997 | Boland et al. |
| 5,687,084 A | 11/1997 | Wertz |
| 5,723,961 A | 3/1998 | Fugino et al. |
| 5,751,589 A | 5/1998 | Sato et al. |
| 5,798,928 A | 8/1998 | Niwa |
| 5,815,400 A | 9/1998 | Hirai et al. |
| 5,825,017 A | 10/1998 | Pryor |
| 5,827,020 A | 10/1998 | Fujita et al. |
| 5,828,574 A | 10/1998 | Robinson et al. |
| 5,844,804 A | 12/1998 | Schussler |
| 5,871,391 A | 2/1999 | Pryor |
| 5,892,345 A | 4/1999 | Olsen |
| 5,917,726 A | 6/1999 | Pryor |
| 5,919,012 A | 7/1999 | Nakagawa et al. |
| 5,926,389 A | 7/1999 | Trounson |
| 5,946,449 A | 8/1999 | Dickerson et al. |
| 5,991,528 A | 11/1999 | Taylor et al. |
| 6,019,554 A | 2/2000 | Hong |
| 6,052,628 A | 4/2000 | Hong |
| 6,064,168 A | 5/2000 | Tao et al. |
| 6,135,857 A | 10/2000 | Shaw et al. |
| 6,163,735 A | 12/2000 | Yamada et al. |
| 6,242,880 B1 | 6/2001 | Hong |
| 6,310,621 B1 | 10/2001 | Gagne et al. |
| 6,317,646 B1 | 11/2001 | de Caussin et al. |
| 6,330,483 B1 | 12/2001 | Dailey |
| 6,350,222 B2 | 2/2002 | Susnjara |
| 6,368,879 B1 | 4/2002 | Toprac |
| 6,400,998 B1 | 6/2002 | Yamazaki et al. |
| 6,401,004 B1 | 6/2002 | Yamazaki et al. |
| 6,438,445 B1 | 8/2002 | Yoshida et al. |
| 6,456,897 B1 | 9/2002 | Papiernik et al. |
| 6,470,225 B1 | 10/2002 | Tutkowitz |
| 6,493,602 B1 | 12/2002 | Kranitzky et al. |
| 6,521,856 B1 | 2/2003 | Marchesi et al. |
| 6,535,788 B1 | 3/2003 | Yoshida et al. |
| 6,587,747 B2 | 7/2003 | Hirai et al. |
| 6,597,142 B2 | 7/2003 | Shibukawa et al. |
| 6,643,563 B2 | 11/2003 | Hosek et al. |
| 6,671,571 B1 | 12/2003 | Matsumiya et al. |
| 6,675,061 B2 | 1/2004 | Hirai et al. |
| 6,704,611 B2 | 3/2004 | Coleman et al. |
| 6,766,216 B2 | 7/2004 | Erichsen et al. |
| 6,772,038 B2 | 8/2004 | Kadono |
| 6,774,598 B1 | 8/2004 | Kohler et al. |
| 6,775,586 B2 | 8/2004 | Shibata et al. |
| 6,782,306 B2 | 8/2004 | Yutkowitz |
| 6,795,749 B2 | 9/2004 | Suh et al. |
| 6,804,575 B2 | 10/2004 | Sagawa et al. |
| 6,850,806 B2 | 2/2005 | Yutkowitz |
| 6,865,499 B2 | 3/2005 | Yutkowitz |
| 6,879,874 B2 | 4/2005 | Sinn |
| 6,920,408 B2 | 7/2005 | Yutkowitz |
| 6,922,606 B1 | 7/2005 | Yutkowitz |
| 6,957,121 B2 * | 10/2005 | Lottgen et al. ................ 700/180 |
| 6,999,841 B1 | 2/2006 | Rutkowski |
| 7,012,395 B2 | 3/2006 | Haunerdinger et al. |
| 7,016,763 B2 | 3/2006 | Fauser et al. |
| 7,050,883 B2 | 5/2006 | Cho et al. |
| 7,096,087 B2 | 8/2006 | Sagawa et al. |
| 2003/0065424 A1 | 4/2003 | Erichsen et al. |
| 2005/0049743 A1 | 3/2005 | Fauser et al. |
| 2005/0055323 A1 | 3/2005 | Zetek et al. |
| 2005/0085940 A1 | 4/2005 | Griggs et al. |
| 2005/0188309 A1 | 8/2005 | Tasker et al. |
| 2005/0190185 A1 | 9/2005 | Fauser et al. |
| 2005/0246052 A1 | 11/2005 | Coleman et al. |
| 2005/0251030 A1 | 11/2005 | Azar |
| 2005/0251284 A1 * | 11/2005 | Balic ........................... 700/182 |
| 2005/0256604 A1 | 11/2005 | Diehi et al. |
| 2006/0149410 A1 | 7/2006 | Erichsen et al. |

FOREIGN PATENT DOCUMENTS

| | | |
|---|---|---|
| JP | 57114325 | 7/1982 |
| JP | 59 069815 | 4/1984 |
| JP | 62130130 | 6/1987 |
| WO | WO9222023 | 12/1992 |

OTHER PUBLICATIONS

Advanced Velocity Control (AVC) and Adaptive Finishing Surface (AFS) Options Manual, 2002, 15 pages.

Bullock, T., "Motion Control and Industrial Controllers," Motion Control, Sep./Oct. 1990.

"Automated Manufacturing Inspection System," NTIS Tech Notes, U.S. Department of Commerce, Springfield, VA, Feb. 1, 1991, p. 179, 1&2.

Imamura, Fumihiko and Kaufman, Howard, "Time Optimal Contour Tracking for Machine Tool Controllers," IEEE Control Systems, Apr. 1991.

Berthiaume, D., "Justification for AC vs. DC Drive Systems," Pulp and Paper Industry Technical Conference, Conference Record of 1991 Annual Volume, Jun. 3-7, 1991, pp. 234-238.

Chuang, Hua-Yi and Liu, Chang-Huan, "A Model-Referenced Adaptive Control Strategy for Improving Contour Accuracy of Multiaxis Machine Tools," IEEE Transactions on Industry Applications, vol. 28., No. 1., Jan./Feb. 1992.

Bullock, T., "Linear and Circular Interpolation," Motion Control, Apr. 1992.

Wilson, C., "How Close Do You Have to Specify Points in a Contouring Application?", Motion Control, May 1993.

Goto, Satoru and Nakamura, Masatoshi, "Accurate Contour Control of Mechatronic Servo Systems Using Gaussian Networks," IEEE Transactions on Industrial Electronics, vol. 43., No. 4, Aug. 1996.

Yeh, Zong-Mu, "Cross-Coupled Fuzzy Logic Control for Biaxial Servomechanisms," IEEE 1996.

Lee, Je-Hie, Huh, Uk-Youl and Park, Ho-Joon, "Improved Contouring Control for Multi-Axis System with Two-Degrees-of-Freedom Structure," International Symposium on Industrial Electronics (ISIE), Guimaraes, Portugal, pp. 901-905, 1997.

Yeh, Syh-Shiuh and Hsu, Pau-Lo, "Theory and Applications of the Robust Cross-Coupled Control Design," Proceedings of the American Control Conference, Albuquerque, New Mexico, Jun. 1997.

Li, Perry Y., "Coordinated Contour Following Control for Machining Operations—A Survey," Proceedings of the American Control Conference, San Diego, California, Jun. 1999.

Lee, Hyun C. and Jeon, Gi J, "Real-time Compensation of Two-dimensional Contour Error in CNC Machine Tools," Proceedings of the 1999 IEEE/ASME International Conference on Advanced Intelligent Mechatronics, Sep. 19-23, 1999, Atlanta, USA.

Lacerda, Helder Barbieri and BELO, Eduardo Morgado, "A Modified Contour Error Controller for a High Speed XY Table," Journal of the Brazilian Society of Mechanical Sciences, vol. 22., No. 3, pp. 443-455, 2000.

Yeh, Syh-Shiuh and Hsu, Pau-Lo, "A New Approach to Biaxial Cross-coupled Control," Proceedings of the 2000 IEEE, International Conference on Control Applications, Anchorage, Alaska USA, Sep. 25-27, 2000.

Chiu, George T.-C., and Tomizuka, Masayoshi, "Contouring Control of Machine Tool Feed Drive Systems: A Task Coordinate Frame Approach," IEEE Transactions on Control Systems Technology, vol. 9, No. 1., Jan. 2001.

Yeh, Syh-Shiuh and Hsu, Pau-Lo, "Estimation of the Contouring Error Vector for the Cross-Coupled Control Design," IEEE/ASME Transactions on Mechatronics, vol. 7., No. 1., Mar. 2002.

Chen, Shyh-Leh, Liu, Hung-Liang and Ting, Sing Ching, "Contouring Control of Biaxial Systems Based on Polar Coordinates," IEEE/ASME Transactions on Mechatronics, vol. 7., No. 3., Sep. 2002.

Hsieh, Chen-Chou, Wang, An-Ping and HSU, Pau-Lo, "CAN-Based Motion Control Design," SICE Annual Conference in Fukui, Aug. 4-6, 2003, Fukui University, Japan.

Wang, Lisong and Zhang, Jing, "The Research of Static De-coupled Contour Control Technique of the Ultra-precision Machine Tool," Proceedings of the 5th World Congress on the Intelligent Control and Automation, Jun. 15-19, 2004 Hangzhou, China.

Xiao, Yong, Zhu, Kuanyi and Liaw, Hwee Choo, "Generalized Synchronization Control of Multi-axis Motion Systems," www.sciencedirect.com, Control Engineering Practice, vol. 13, pp. 809-819, 2005.

John Kieffer, Aidan J. Cahill, and Matthew R. James, "Robust and Accurate Time-Optimal Path-Tracking Control for Robot Manipulators," IEE Transactions on Robotics and Automation, vol. 13, No. 6, Dec. 1997.

John Kieffer, Aidan J. Cahill, and Matthew R. James, "Time-Opitamal Path Tracking to a Specified tolerance in the Presence of Plant Uncertaintu," Australian National University.

L.M. Galantucci, L. Tricarico, and A Dersha, "Automatic Clamping Selection in Process Planning using Tolerance Verification Algorithms," Advanced Manufacturing Systems and Technology, Springer Verlag, Wein, New York, 1996.

Ales Hace, et al., "Rubust Motion Control and Trajectory Planning for Planar Laser Cutting System," IEEE Advanced Motion Control Proceedings COIMBRA, 1998.

Hong C. Zhang and J. Mei, "Automated Tolerance Anaysis for CAPP System," International Journal of Advance Manufacturing Technology, 10:219-224, 1995.

Parimal Kopardekar and Sam Anand, "Tolerance Allocation using Neural Networks," International Journal of Advance Manufacturing Technology, 10:269-276, 1995.

M.M. Sfantiskopoulos, et al., "Concurrent Dimensioning for Accuracy and Cost," International Journal of Advance Manufacturing Technology, 10:236-268m 1995.

O.H. Chai, et al., "An Interpolation Scheme for Tool-Radius Compensated Parabolic Paths for CNC," IIE Transactions, 28:11-17, 1996.

Y.D. Chen, J. Ni, and S.M. Wu, "Real-Time CNC Tool Path Generation for Machining IGES Surfacs," Transactions of the ASME, vol. 115, Nov. 1993.

G.S. Li, et al., "In-Process Drilling States Monitoring in Machine Centre By Time Series Analysis," International Conference on Manufacturing Autmation, vol. 1712, 1992.

International Search Report and the Written Opinion of the International Searching Authority for PCT/US2007/075003, 14 pages.

* cited by examiner

SFQ 100 (roughing) 50 (finishing)
Run Time 2:49:13

SFQ 50 (roughing) 50 (finishing)
Run Time 3:41:13

Same Surface Finish Quality and Saved near One Hour Using High SFQ Value in Roughing

SYSTEM AND METHOD FOR SURFACE FINISH MANAGEMENT

RELATED APPLICATIONS

This application claims the benefit of U.S. Provisional Application Ser. No. 60/821,513, filed on Aug. 4, 2006, titled SYSTEM AND METHOD FOR SURFACE FINISH MANAGEMENT, the disclosure of which, including the source code appendix and Appendix A, is expressly incorporated by reference herein.

BACKGROUND AND SUMMARY OF THE INVENTION

The present invention relates generally to the control of a motion device. More particularly, the present invention relates to the control of moveable portions of a machine tool system to control a surface finish of a part machined with the machine tool system.

It is known in the machine tool industry that there is a trade-off between surface finish quality and throughput. A cause of this trade-off is the bandwidth limited dynamic response of the machine axes to demanding input signals (i.e. commanded tool paths).

It is also known to provide a user of a machine tool system with three selections of surface finish quality, each of which has a defined set of parameters for the motion control system of the machine tool system. The ULTIMAX brand system available from Hurco Companies, Inc. included adaptive surface finish software as a part of the motion control system that gave a user the ability to select between "Precision," "Standard," or "Performance."

The present disclosure relates to a motion control system for a machine tool system. In an exemplary embodiment of the present disclosure, a value of a surface finish quality ("SFQ") parameter of the motion control system is adjusted to control the surface finish of a part machined with the machine tool system.

In another exemplary embodiment of the present disclosure, a method for controlling a machine tool system to machine a part is provided. The method comprising the steps of providing a motion control system having a conversational mode of operation and a NC mode of operation; setting a default SFQ value; determining, based on the default SFQ value, a default set of values for a plurality of system parameters of the motion control system for controlling a movement along a first axis of the machine tool system from a first set of values of the plurality of parameters of the motion control system associated with a first SFQ value and a second set of values of the plurality of parameters of the motion control system associated with a second SFQ value; receiving a desired geometry for the part through one of the conversational mode of operation and the NC mode of operation; and moving the machine tool system based on the default set of values of the plurality of parameters of the motion control system to perform at least a first operation during machining of the part.

In still another exemplary embodiment of the present disclosure, a method for controlling the movement of a machine tool system to machine a part is provided. The method comprising the steps of associating a first set of values of a plurality of parameters of a motion control system with a first value of an SFQ parameter, the SFQ parameter having a range of possible values; associating a second set of values of the plurality of parameters of the motion control system with a second value of the SFQ parameter; receiving a first desired value of the SFQ parameter; determining a third set of values of the plurality of parameters of the motion control system for controlling the movement of the machine tool based on the first desired value of the SFQ parameter from the first set of values of the plurality of parameters of the motion control system associated with the first value of the SFQ parameter and the second set of values of the plurality of parameters of the motion control system associated with the second value of the SFQ parameter; moving the machine tool system based on the third set of values of the plurality of parameters of the motion control system to perform at least a first operation during machining of the part; receiving a second desired value of the SFQ parameter; determining a fourth set of values of the plurality of parameters of the motion control system for controlling the movement of the machine tool based on the second desired value of the SFQ parameter from the first set of values of the plurality of parameters of the motion control system associated with the first value of the SFQ parameter and the second set of values of the plurality of parameters of the motion control system associated with the second value of the SFQ parameter; and moving the machine tool system based on the fourth set of values of the plurality of parameters of the motion control system to perform at least a second operation during the machining of the part.

In a further exemplary embodiment of the present disclosure, a method for controlling the movement of a machine tool system to machine a part is provided. The method comprising the steps of determining a first set of values of the plurality of parameters for controlling the movement of the machine tool system based on a first value of an SFQ parameter, the SFQ parameter having a range of possible values; performing at least a first operation with a first tool based on the first set of values of the plurality of parameters; replacing the first tool with a second tool, the second tool having a second value of the SFQ parameter associated therewith; determining a second set of values of the plurality of parameters for controlling the movement of the machine tool system based on the second value of the SFQ parameter; and performing at least a second operation with the second tool based on the second set of values for the plurality of parameters.

In still a further exemplary embodiment of the present disclosure, a method for controlling the movement of a machine tool system to machine a part is provided. The method comprising the steps of determining a first set of values of the plurality of parameters for controlling the movement of the machine tool system based on a first value of an SFQ parameter, the SFQ parameter having a range of possible values; selecting a first tool for performing at least a first operation; determining whether the first tool has an associated value of the SFQ parameter, wherein if the first tool has an associated value of the SFQ parameter determining a second set of values of the plurality of parameters for controlling the movement of the machine tool system based on the associated value of the SFQ parameter and otherwise using the first set of values of the plurality of parameters for controlling the movement of the machine tool system based on the first value of an SFQ parameter; and performing at least a first operation with the first tool.

In yet still a further exemplary embodiment of the present disclosure, an apparatus 28. An apparatus for machining a part with at least one tool is provided. The apparatus comprising a frame; a moveable support supported by and moveable relative to the frame, the moveable support supporting the part; a machine tool spindle supported by the frame and moveable relative to the part, the machine tool spindle adapted to couple the at least one tool; a motion control system operably coupled to the machine tool spindle and the moveable support, the motion control system executing the machining of the part through the controlled movement of the machine tool spindle and the moveable support; and a user interface including at least one display and at least one input member. The user interface operably coupled to the motion control system, wherein the motion control system receives a desired geometry through the user interface and at least one value of an SFQ parameter through the user interface. The user interface having a conversational mode wherein an operator specifies the desired geometry and the at least one value of the surface quality finish parameter and a NC mode wherein an NC program including the desired geometry and the at least one value of the SFQ parameter is supplied to the at least one input member. The motion control system determining at least one set of values for a plurality of parameters based on the at least one value of the SFQ parameter from at least two known sets of values of the plurality of parameters associated with at least two values of the SFQ parameter.

In yet still another exemplary embodiment of the present disclosure, a computer readable medium having computer-executable instructions for controlling the movement of a machine tool system to machine a part is provided. The computer executable instructions comprising instructions to store a default value for an SFQ parameter received through a user interface; instructions to determine a default set of values of a plurality of parameters of a motion control system for controlling the movement of the machine tool system based on the default value of the SFQ parameter from a first set of values of the plurality of parameters of the motion control system associated with a first value of an SFQ parameter and a second set of values of the plurality of parameters of the motion control system associated with a second value of the SFQ parameter; and instructions to move the machine tool system based on the default set of values of the plurality of parameters of the motion control system to perform at least a first operation during the machining of the part.

In still yet a further exemplary embodiment of the present disclosure, a computer readable medium having computer-executable instructions for controlling the movement of a machine tool system to machine a part is provided. The computer executable instructions comprising: instructions to determine a first set of values of the plurality of parameters for controlling the movement of the machine tool system based on a first value of an SFQ parameter, the SFQ parameter having a range of possible values; instructions to perform at least a first operation with a first tool based on the first set of values of the plurality of parameters; instructions to replace the first tool with a second tool, the second tool having a second value of the SFQ parameter associated therewith; instructions to determine a second set of values of the plurality of parameters for controlling the movement of the machine tool system based on the second value of the SFQ parameter; and instructions to perform at least a second operation with the second tool based on the second set of values for the plurality of parameters.

In still yet another exemplary embodiment of the present disclosure, a computer readable medium having computer-executable instructions for controlling the movement of a machine tool system to machine a part is provided. The computer executable instructions comprising instructions to determine a first set of values of the plurality of parameters for controlling the movement of the machine tool system based on a first value of an SFQ parameter, the surface quality parameter having a range of possible values; instructions to select a first tool for performing at least a first operation; instructions to determine whether the first tool has an associated value of the SFQ parameter, wherein if the first tool has an associated value of the SFQ parameter instructions to determine a second set of values of the plurality of parameters for controlling the movement of the machine tool system based on the associated value of the SFQ parameter and otherwise instructions for using the first set of values of the plurality of parameters for controlling the movement of the machine tool system based on the first value of an SFQ parameter; and instructions to perform at least a first operation with the first tool.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

FIG. 9 illustrates an exemplary screen of a user interface wherein a parameter value of an SFQ parameter is specified for a first tool;

FIG. 10 illustrates an exemplary screen of a user interface wherein a portion of an exemplary NC program is displayed;

Corresponding reference characters indicate corresponding parts throughout the several views.

DETAILED DESCRIPTION OF THE DRAWINGS

The embodiments disclosed herein are not intended to be exhaustive or limit the invention to the precise form disclosed in the following detailed description. Rather, the embodiments are chosen and described so that others skilled in the art may utilize the teachings.

Figure 1:
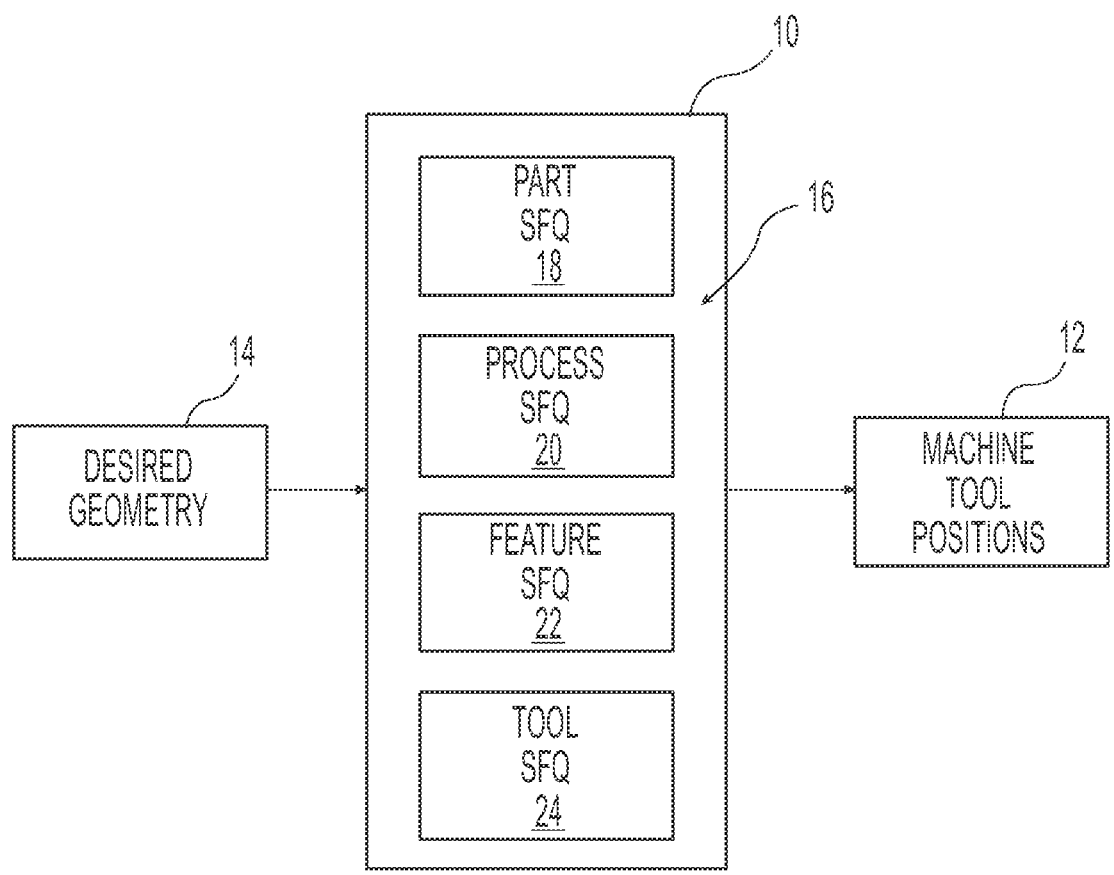
FIG. 1 illustrates a representation of an exemplary motion control system.

Referring to FIG. 1, a motion control system 10 is provided that is able to generate machine tool positions 12 to manufacture a desired machine part, such as a part or a mold, based on a desired geometry 14. The machine tool positions correspond to the positions along each of the axes of the machine tool system. For example, the machine tool system 200 in FIG. 6 includes five axes along which a part or a tool may be moved to various positions. The motion control system 10 generates the machine tool positions 12 based on one or more user specifiable surface finish quality ("SFQ") parameter values 16. As explained herein SFQ parameter values permit a user to specify a desired surface finish quality for a desired machine part or a given aspect of a desired machined part. The SFQ values may be specified for the overall part 18, for various operations 20 performed during creation of the machine part, for various features 22 of the machine part, for various tools 24 used in making the machine part, and/or combinations thereof. As explained herein, by using the SFQ values 16 the motion control system 10 is able to quickly produce a high surface quality component and to permit the user to have better control over surface finish by specifying one or more values for an SFQ parameter.

Figure 2:
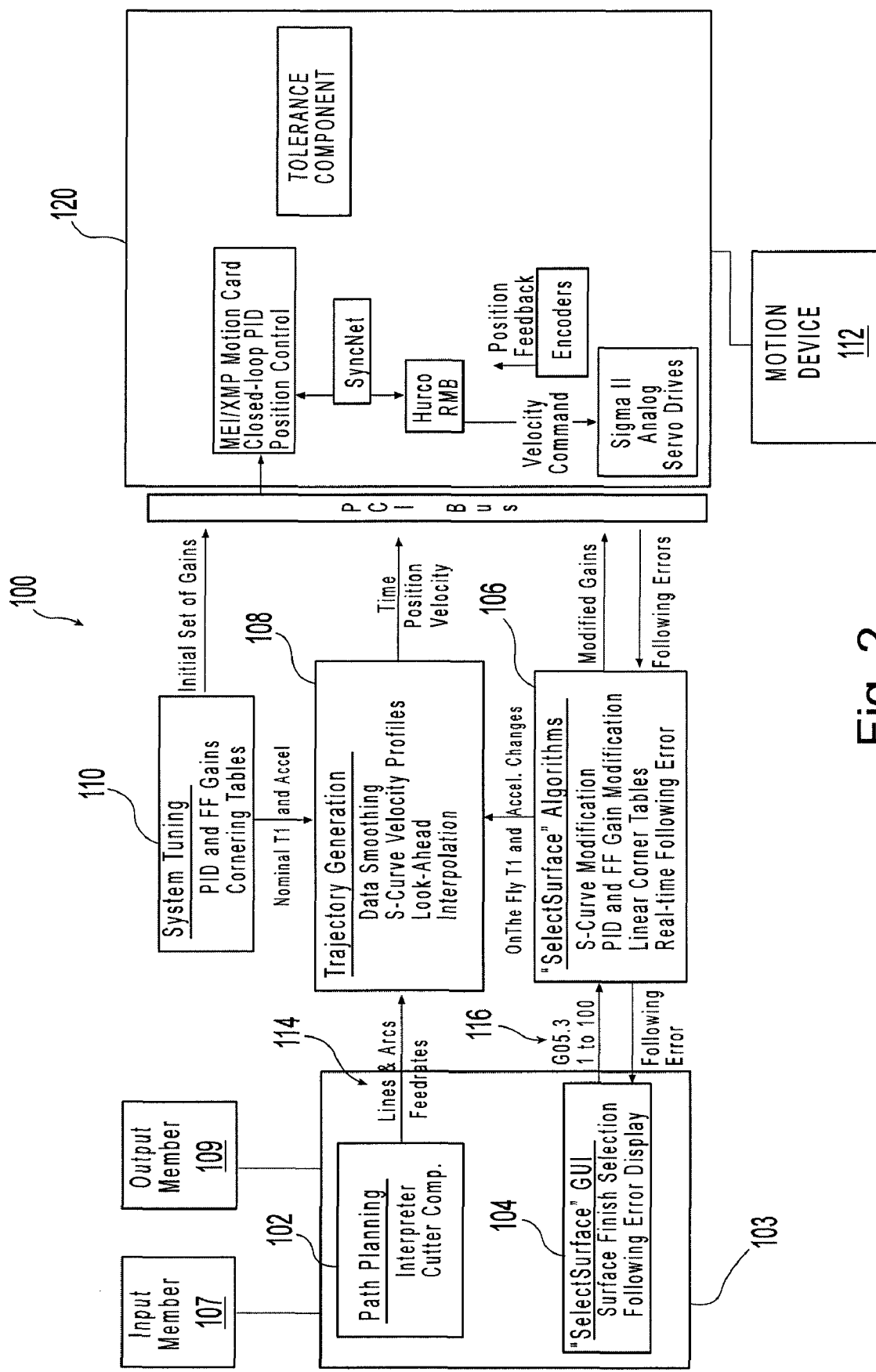
FIG. 2 illustrates a representation of an exemplary motion control system.

Referring to FIG. 2, an exemplary motion control system 100 is shown. Motion control system 100 includes a software component including a path planning interface component 102, a surface finish interface component 104, a surface finish algorithm component 106, a trajectory generation component 108, and a system tuning component 110. The various components listed are identified based on function and are not required to be separate components, but rather may be implemented in a plurality of ways. In one embodiment, the software components are stored on a computer readable media accessible by a controller for execution of the software components. In one embodiment, path planning interface component 102 and surface finish interface component 104 are non-real time applications and surface finish algorithm component 106, trajectory generation component 108, and system tuning component 110 are real time applications.

Figure 6:
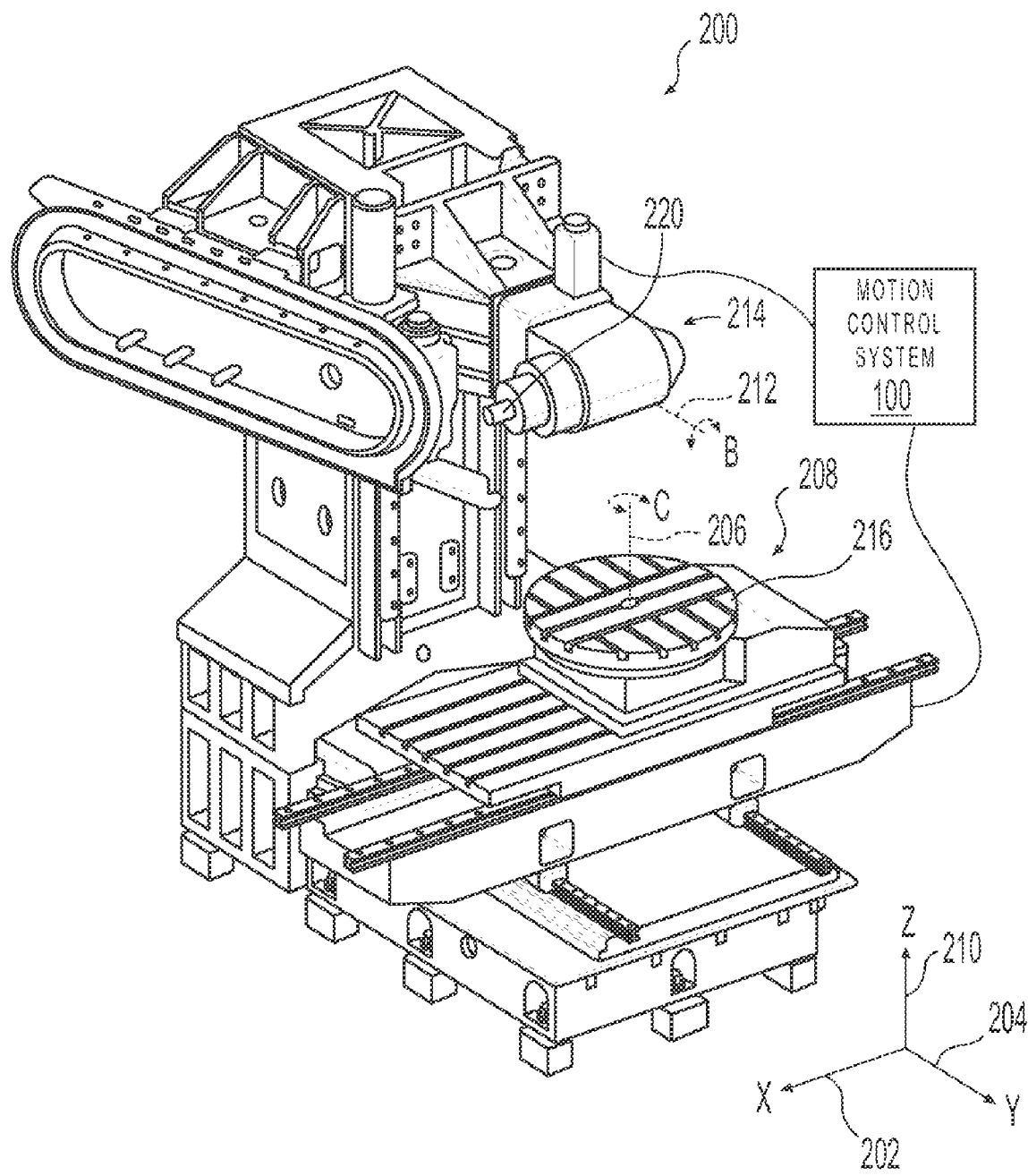
FIG. 6 illustrates an exemplary machine tool system.

Path planning interface component 102 and surface finish interface component 104 are a part of a user interface 103. User interface 103 permits interaction with a user of a machine tool system 200 shown in FIG. 6. Exemplary machine tool systems generally include as least three axis of movement. Referring to FIG. 6, the illustrated machine tool system 200 is a five axis machine tool system having a x-axis 202, a y-axis 204, a rotational c-axis 206 provided as part of a moveable table 208, a z-axis 210 and a rotational b-axis 212 provided as part of a moveable tool support 214. Tool support 214 includes a tool spindle 220 for holding a motion device 112 which is used to machine the desired machined part. Exemplary motion devices include a drill, a reamer, a tap, and other suitable motion devices.

Motion control system 100 controls the movement of each of x-axis 202, y-axis 204, c-axis 206, z-axis 210, and b-axis 212 to machine a part that is supported on surface 216 of moveable table 208 through motion component 120. As explained herein for two SFQ parameter values of 1 and 100, gain parameters 162 are specified for each of x-axis 202 (see FIGS. 4 and 5), y-axis 204, c-axis 206, z-axis 210, and b-axis 212 through user interface 103.

User interface 103 further includes at least one input member 107 and at least one output member 109. The at least one input member is used to receive information from a user or other source related to the machined part to be machined. Exemplary input members 107 include a touch screen, a keyboard, one or more buttons or switches, a CD drive, a floppy drive, an interface to a computer network (wireless or wired), and other suitable devices for providing information to motion control system 100. Exemplary output members 109 include a display (such as a touch screen), lights, a printer, and other suitable devices for presenting information.

Additional details of motion control system 100 are provided in U.S. Provisional Application Ser. No. 60/821,513, filed on Aug. 4, 2006, titled SYSTEM AND METHOD FOR SURFACE FINISH MANAGEMENT. In one embodiment, the software component is an object-oriented software component. In another embodiment, the software component is based on the software described in U.S. Pat. No. 5,453,933 issued on Sep. 26, 1995 and titled CNC CONTROL SYSTEM, the disclosure of which is expressly incorporated by reference herein.

Further, the software component may include the functionality disclosed in U.S. Provisional Patent Application Ser. No. 60/821,503; filed Aug. 4, 2006, titled SYSTEM AND METHOD FOR TOOL CENTER POINT MANAGEMENT, U.S. Provisional Patent Application Ser. No. 60/821,523; filed Aug. 4, 2006, titled KINEMATICS COMPENSATION OBJECT ORIENTED SYSTEM AND METHOD FOR MACHINE TOOL CONTROL; and U.S. Provisional Patent Application Ser. No. 60/821,481; filed Aug. 4, 2006, titled SYSTEM AND METHOD FOR TOOL USE MANAGEMENT, the disclosures each of which are expressly incorporated by reference herein.

Path planning interface component 102 receives information about the desired geometry to create with a motion device 112, such as a tool. Regardless of the source of the desired geometry, path planning interface component 102 provides information 114 related to how to generate the desired geometry with motion device 112 to trajectory generation component 108. In one embodiment, information 114 includes trajectories, such as lines and arcs, and feedrates.

Path planning interface component 102, in one embodiment, receives geometry information generated at a stand-alone CAM package, such as over a network or from a portable computer readable media. In one example, path planning interface component 102 receives a program file that specifies the desired geometry. In one example, path planning interface component 102 receives an NC program expressed in a standard G&M code language, or a close derivative of this language based on either the International Standards Organization (ISO) or the Electronics Industries Association (EIA) RS-274-D, using codes identified by letters such as G, M, and F. The codes define a sequence of machining operations to control motion in the manufacture of a part. Trajectory generation component 108 converts the codes to a series of electrical signals which motion component 120 uses to control machine control system 200 effecting the motion of one or more tools along a programmed trajectory either by a movement of the tool relative to the part, a movement of the part relative to the tool, and/or a movement of both the tool and the part.

Path planning interface component 102, in one embodiment, receives geometry information from a user through a user interface. In one example, a user may be programming a second part through the user interface 103 while the motion control system 100 is cutting a first part. An exemplary path planning interface component is the WINMAX brand interface available from Hurco Companies, Inc. located at One Technology Way in Indianapolis, Ind. In one example, a user may specify the desired geometry through the programming of data blocks with the interface.

Motion device 112 corresponds to one or more tools used to remove material from a piece of material to create a desired machine part. In one embodiment, a plurality of tools are supported in an automatic tool changer, each in a tool station as disclosed in U.S. Provisional Patent Application Ser. No. 60/821,481; filed Aug. 4, 2006, titled SYSTEM AND METHOD FOR TOOL USE MANAGEMENT, the disclosure of which is expressly incorporated by reference herein.

Surface finish interface component 104 receives information about the desired surface finish of the geometry to create with motion device 112. As explained herein, a user may specify one or more values for an SFQ parameter. For example, a single overall SFQ parameter value may be specified. This will result in motion control system 100 controlling the movement of motion device 112 relative to the part to maintain a surface finish quality generally corresponding to the single overall SFQ parameter value during the entire operation of the motion device 112. Further, SFQ parameter values may be specified based on the tool being used, the operation being performed, and the feature being machined. In one embodiment, a user provides at least one SFQ parameter value, the tool path, and the feedrates for the tool to motion control system 100. The surface finish algorithm component 106 acts on this input and modifies servo gains and the acceleration and jerk parameters on the fly to achieve desired surface finish specified by the at least one value for the SFQ parameter.

In one embodiment, surface finish interface component 104 provides information 116 to surface finish algorithm component 106 which provides modified gains for parameters of motion control system 100, such as the PID gains, the feed forward gains, modified cornering table parameter values, and real time following error tolerances based on the desired surface finish quality.

System tuning component 110 provides an initial set of gain values for the PID gains, the feed forward gains, acceleration related parameters, and jerk related parameters. System tuning component 110 further provides initial cornering table parameter values which control the feedrate slowdowns when transitioning between line segments.

As is known, a given machining center, such as the VTX/HTX Series Machining Centers available from Hurco Companies, Inc. located at One Technology Way in Indianapolis, Ind., has a machine response to requested movements of the moveable axes which causes a movement of a machine tool. A given motion device, also has a response to requested movements. Typically, the machine response is the dominant factor in the overall response and any response of the motion device is negligible. As such, in one embodiment, surface finish algorithm component 106 varies the gain parameters based on the dominant machine response irrespective of the motion device 112 being used.

In one embodiment, the values for the gain parameters, such as the PID gains and the feed forward gains, based on a specified SFQ parameter value are calculated as follows. Through experimentation two sets of values for a plurality of gain parameters are determined. A first set of values for the plurality of gain parameters correspond to a low gain situation wherein the motion device 112 moves more slowly relative to the part and is less responsive to changes in acceleration and direction. The first set of values for the plurality of gain parameters should be chosen to provide an acceptable movement of motion device 112 that reasonably follows the desired geometry. A second set of values for the plurality of gain parameters correspond to a high gain situation wherein the motion device 112 moves more quickly relative to the part and is more responsive to changes in acceleration and direction. The second set of values for the plurality of gain parameters should be set to prevent machine resonance which may accompany fast accelerations and to reduce any overshooting of the motion device 112 relative to the part to an acceptable level or eliminate any overshooting of motion device 112. In one embodiment, the first set of values for the plurality of gain parameters and the second set of values for the plurality of gain parameters are determined by monitoring the response of the machine tool system 200 to a step input.

Figure 3:
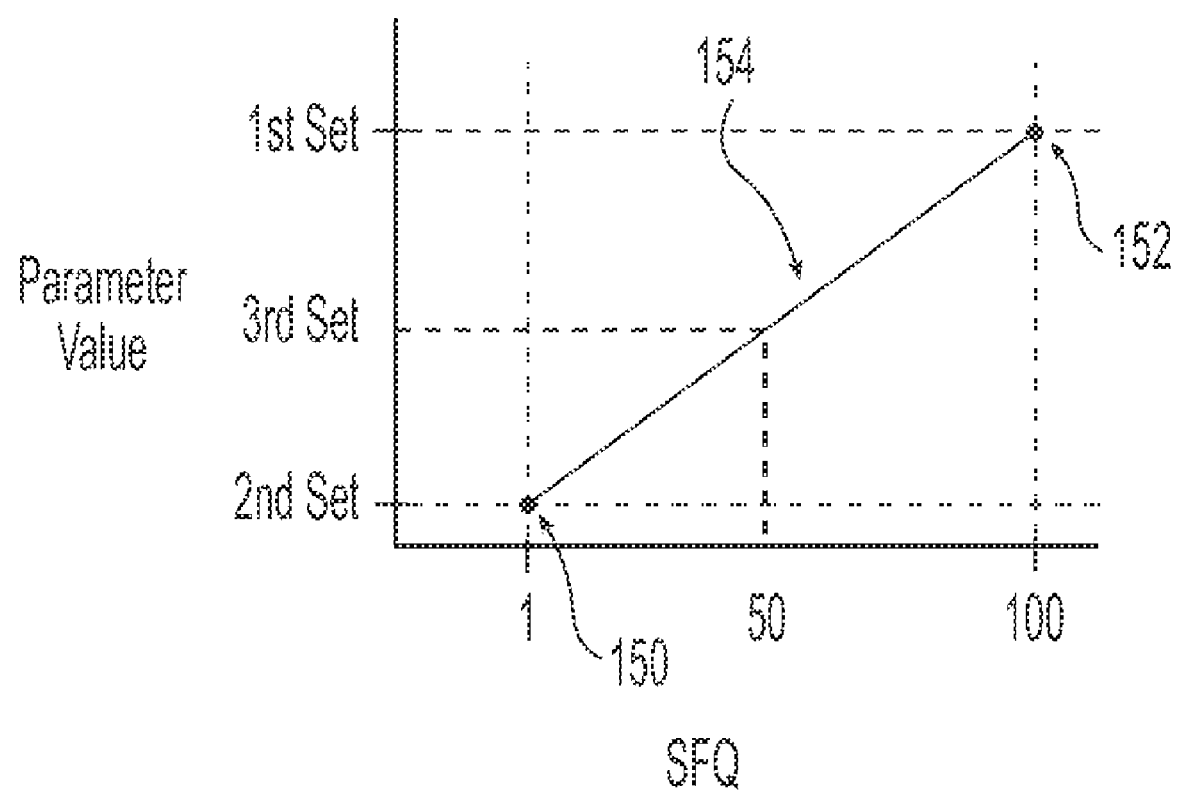
FIG. 3 illustrates a graphical representation of the relationship between values of an SFQ parameter and system parameter values, such as gain parameters.

Once the first set of values for the plurality of gain parameters and the second set of values for the plurality of gain parameters have been determined, they are set to correspond to an SFQ parameter value of 100 and an SFQ parameter value of 1, respectively. This is represented in FIG. 3 for a first parameter of the plurality of parameters. Referring to FIG. 3, point 150 corresponds to an SFQ value of 1 and the specified value in the second set of experimentally determined gains for the first parameter of the plurality of parameters. Point 152 corresponds to an SFQ value of 100 and the specified value in the first set of experimentally determined gains for the first parameter of the plurality of parameters. A similar graph may be made to illustrate the correspondence between values of the SFQ parameter and a given parameter of the plurality of parameters. The curve in FIG. 3 may correspond to the proportional gain parameter.

In one embodiment, the potential values for the SFQ parameter range from 1 to 100, point 150 (SFQ=1, Gain=parameter value for parameter from the second set of values) and point 152 (SFQ=100, Gain=parameter value for parameter from the first set of values), define the values for the given gain parameter at the endpoints of the SFQ scale or curve 154. Function 154 may be defined such that it passes through point 150 and point 152. Function 154 is used to determine the value of the first parameter that correspond to an SFQ parameter value between 1 and 100. In one embodiment, function 154 requires that for an SFQ parameter value between 1 and 100, the resultant value of the first parameter gain is at least equal to the value of the first parameter of the second set of gains and does not exceed the value of the first parameter of the first set of gains. In the illustrated embodiment, function 154 is a linear function as illustrated in FIG. 3. The two endpoints, point 150 (SFQ=1, Gain=parameter value for parameter from the second set of values) and point 152 (SFQ=100, Gain=parameter value for parameter from the first set of values), define a line which is used as the basis for calculating a third value of the first parameter of the plurality of parameters for an intermediate value of SFQ parameter, such as SFQ=50.

Figure 4:
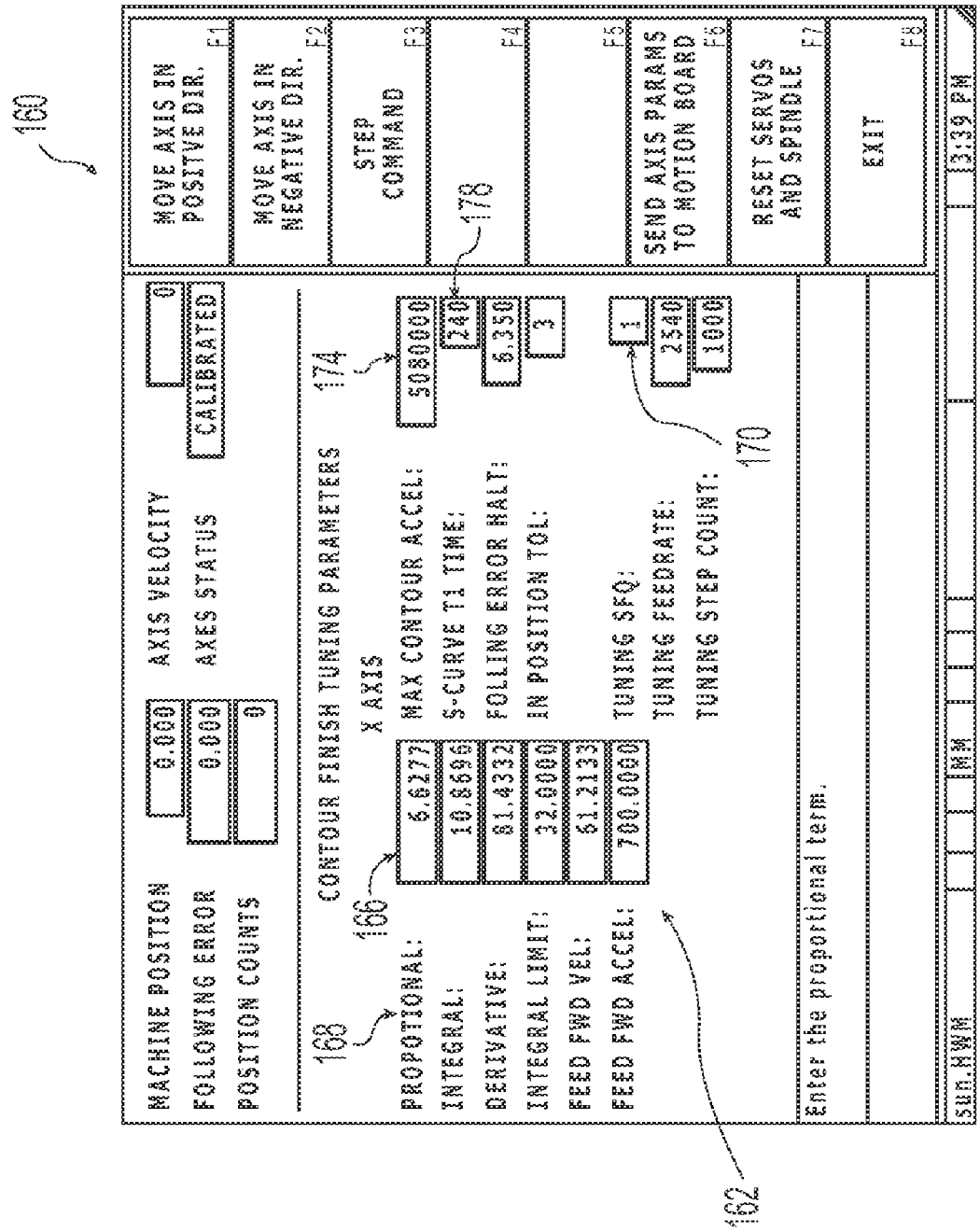
FIG. 4 illustrates an exemplary screen of a user interface wherein a first set of parameter values are specified.

In one embodiment, a user specifies the first set of values for the plurality of gain parameters and the second set of values for the plurality of gain parameters through user interface 103. In one embodiment, a user specifies the first set of values for the plurality of gain parameters and the second set of values for the plurality of gain parameters through a GUI user interface 103. Referring to FIG. 4, an exemplary screen 160 of user interface 103 is shown. The gain parameters 162 may be set through selection inputs 166 (indicated for the proportional parameter 168). Illustratively, selection inputs 166 are fill-in fields. Other exemplary selection inputs may be used, including sliders. The gain parameters 162 are specified for a particular SFQ parameter value 170. Illustratively, the gain parameters 162 correspond to an SFQ parameter value of 1. In a similar fashion, gain parameters 163 are specified for an SFQ parameter value of 100, reference number 171 in FIG. 5. As such, the values of gain parameters for points 150 and 152 are established.

It should be noted that user interface 103 permits the entry of gain parameters 162 for an x-axis of a machine tool system, such as machine tool system 200. In addition to having a plurality of functions 154 for the x-axis, one for each parameter that is settable through the SFQ parameter, additional functions 154 are established for the similar parameters for y-axis 204, c-axis 206, z-axis 210, and b-axis 212 of machine tool system 200 through user interface 103.

In one embodiment, surface finish algorithm component 106 also uses a linear relationship to determine the commanded acceleration values and jerk parameters based on the value of the SFQ parameter input. The larger the value of the SFQ parameter, the greater the acceleration. With larger acceleration machine throughput is increased but a lower surface finish quality is realized, and with less acceleration surface finish is improved at the expense of longer cutting time. Once again, values for the commanded acceleration and jerk parameters are determined at two extreme settings of the machine. These two extremes are assigned to the endpoints of the SFQ parameter range of values.

Figure 5:
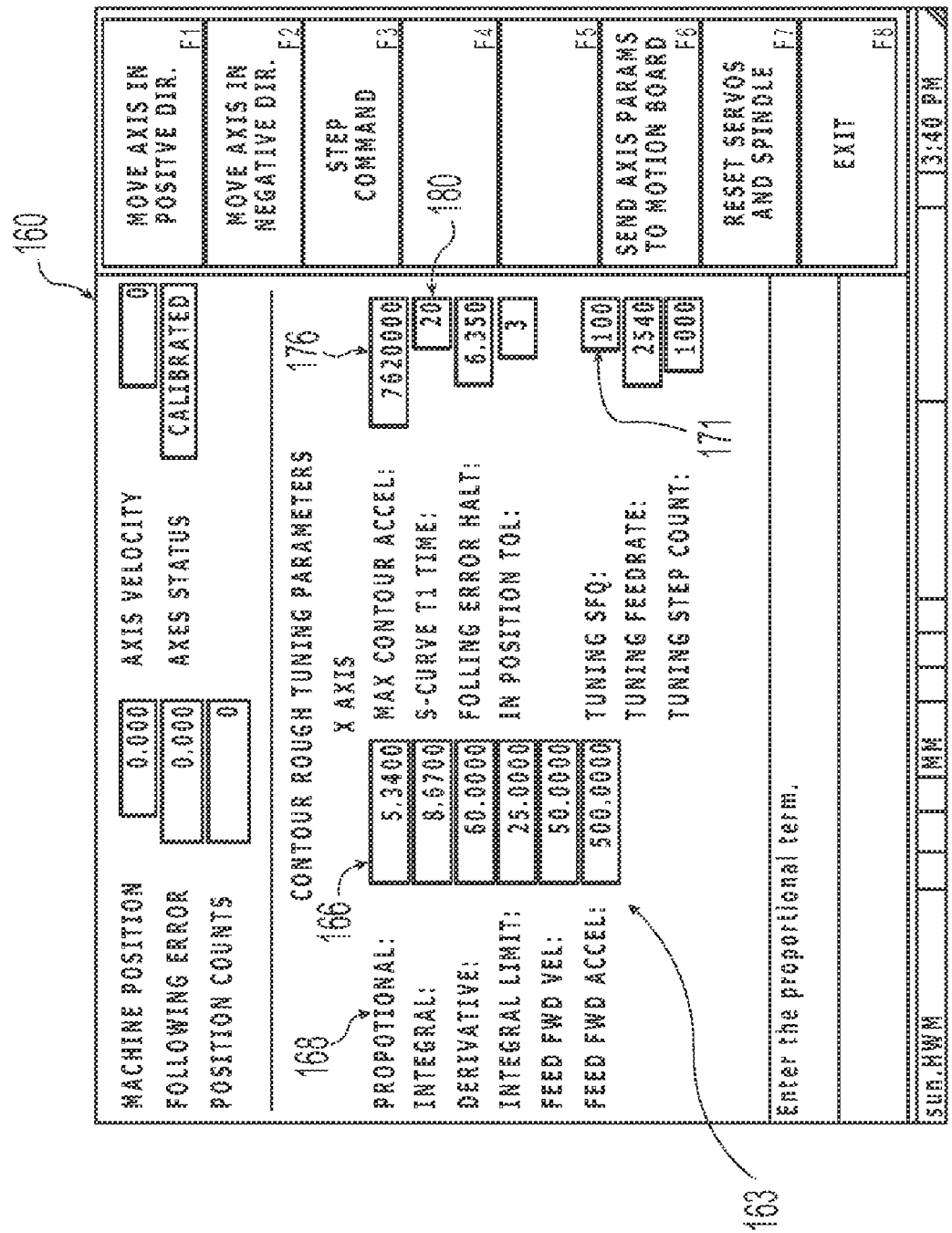
FIG. 5 illustrates an exemplary screen of a user interface wherein a second set of parameter values are specified.

Referring to FIG. 4, an acceleration parameter value 174 is specified for the SFQ parameter value of 1. Referring to FIG. 5, an acceleration parameter value 176 is specified for the SFQ parameter value of 100. In addition, values are specified for the S-curve T1 time which relates to the jerk. The T1 time corresponds to the time period for constant acceleration to be reached. Referring to FIG. 4, an S-curve T1 time parameter value 178 is specified for the SFQ parameter value of 1. Referring to FIG. 5, an S-curve T1 time parameter value 180 is specified for the SFQ parameter value of 100. Values for acceleration and jerk may be found for intermediate SFQ parameter values based on a function which passes through the endpoints of the SFQ range. In one embodiment, the function is a linear function. In a similar manner as with the values for the gain parameters, the values for the acceleration and jerk parameters are specified for the two SFQ endpoints for each of x-axis 202, y-axis 204, c-axis 206, z-axis 210, and b-axis 212 through user interface 103.

The cornering table parameters are also adjusted based on a value of the SFQ parameter. The parameters for the cornering table, illustratively parameters A, B, and C below, are chosen for the range of SFQ parameter values. As shown in equation (1) the slowdown feedrate threshold for a given SFQ parameter value may be determined. In one embodiment, coefficient A is set to zero resulting in the slowdown feedrate threshold being a linear function based on the SFQ parameter value.

The cornering algorithm first computes a slowdown feedrate threshold, then computes the corner feedrate for each axis, and then determines the final corner feedrate which is the minimum of all the individual axis corner federates. The angle of the corner is implied by the values of the unit direction vector.

The equation for the slowdown threshold is:

$$\text{Slowdown feedrate threshold} = Ax^2 + Bx + C \quad (1)$$

where ABC=the cornering coefficients, which are parameterized and x=SFQ/100, where the user has selected the SFQ value (1-100).

The equation for the corner feedrate for each axis is:

$$\text{Axis Corner Feedrate} = \frac{\text{slowdown feedrate threshold}}{|u - v|} \quad (2)$$

where u=unit direction vector for next move, for a given axis, and
v=unit direction vector for the last move, for a given axis.
The final corner feedrate is the minimum of each of the individual axis corner feedrates:

$$\text{Final Corner Feedrate} = \text{MIN}(F_x, F_y, F_z, F_a, F_b, F_c) \quad (3)$$

Trajectory generation component 108 provides the position points or ideal trajectory for the motion device to follow to create the desired geometry. Various techniques are used to determine the position points including data smoothing. As mentioned herein, a user may specify a smoothing parameter which in effect will vary the degree that the position points may differ from the true desired positions.

The data smoothing transforms the part program data received from path planning interface component 102 into high quality motion data which is used by motion component 120 of motion control system 100. The smoothing of the received data may be particularly useful with legacy part programs expressing complex part geometry using polygon approximations. The smoothing operations minimize the faceting of the polygon approximations while maintaining the position points within a desired tolerance.

Figure 7:
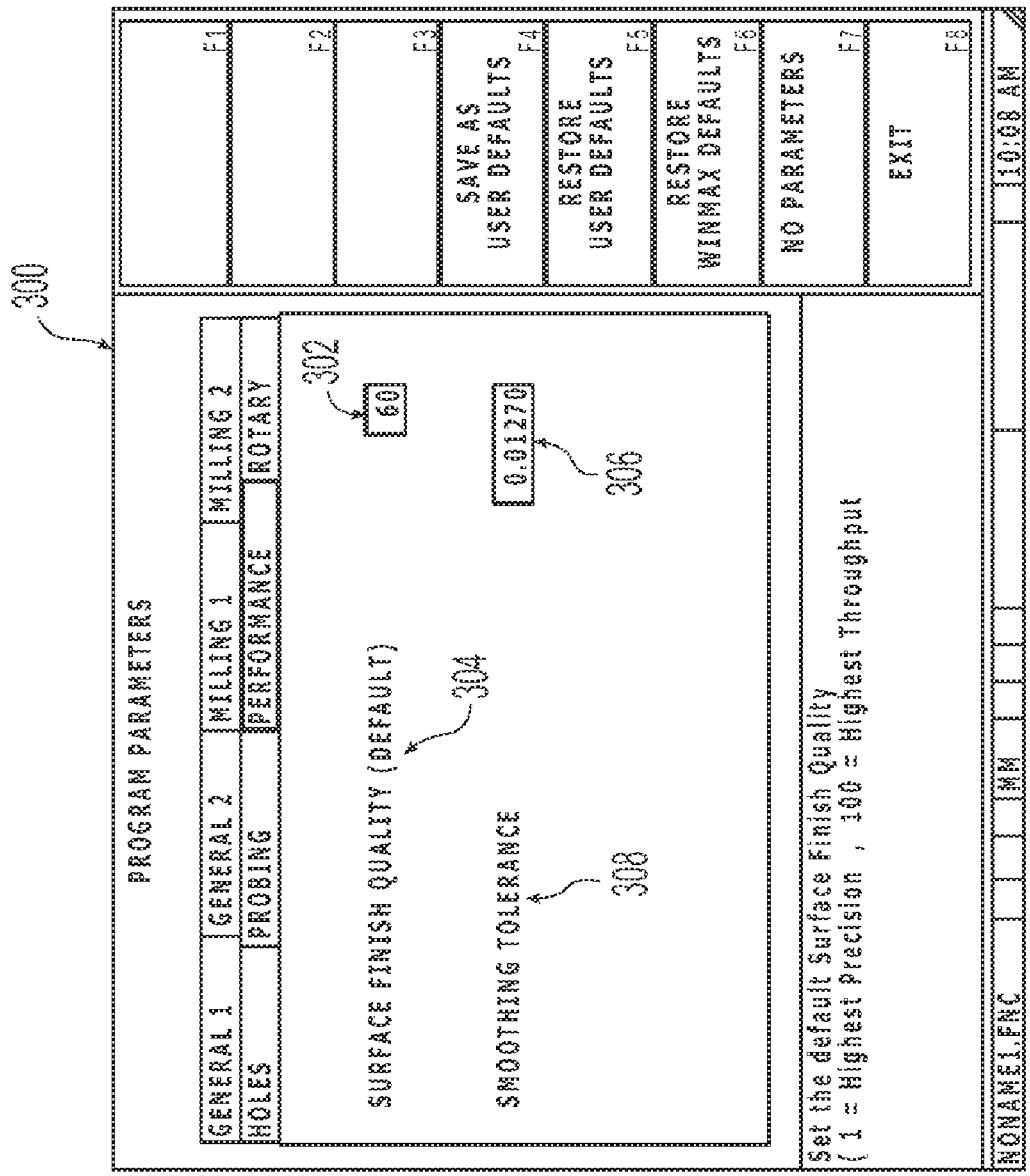
FIG. 7 illustrates an exemplary screen of a user interface wherein a default parameter value of an SFQ parameter is specified.
Figure 8:
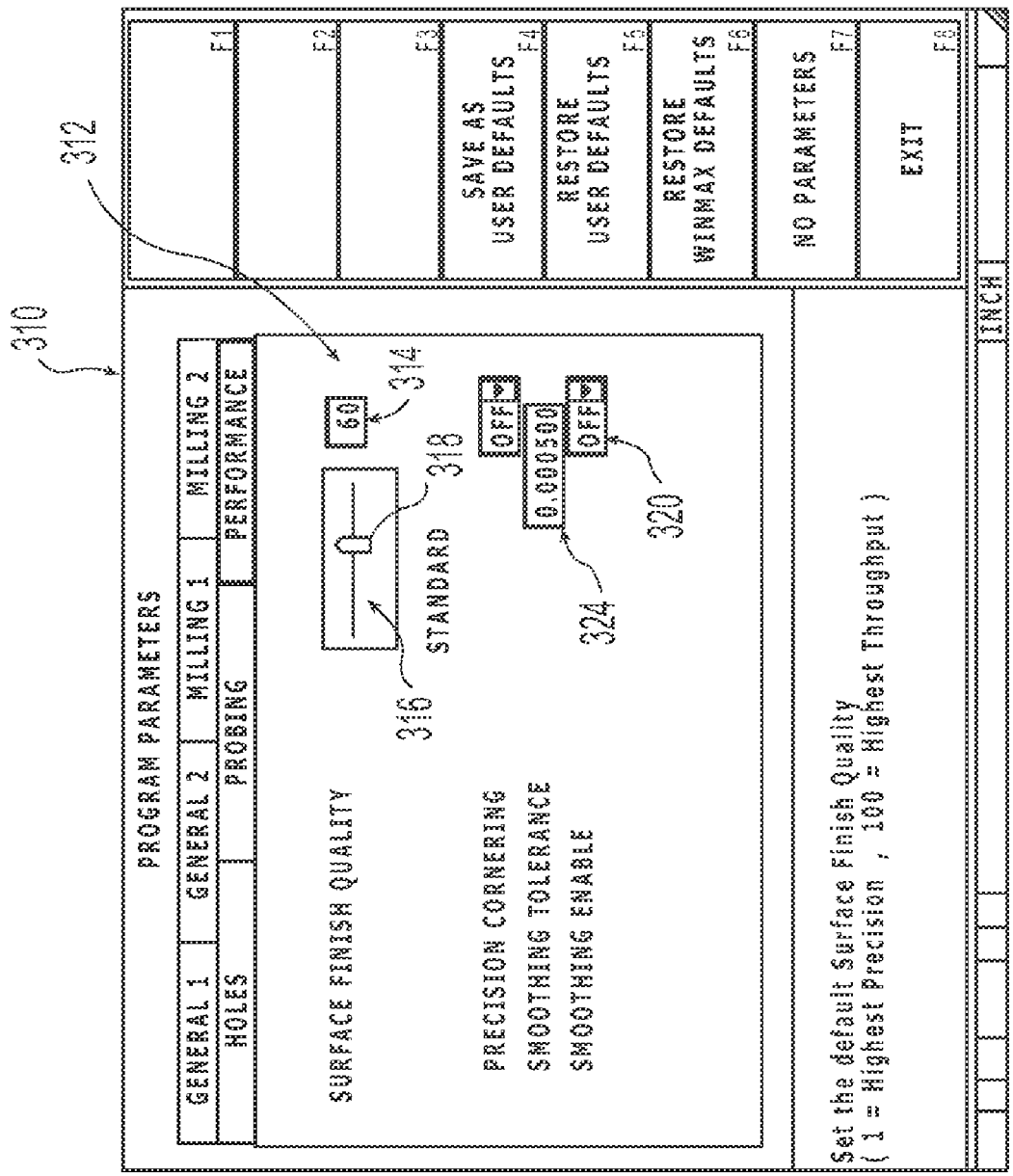
FIG. 8 illustrates an exemplary screen of a user interface wherein a default parameter value of an SFQ parameter is specified.
Figure 12:
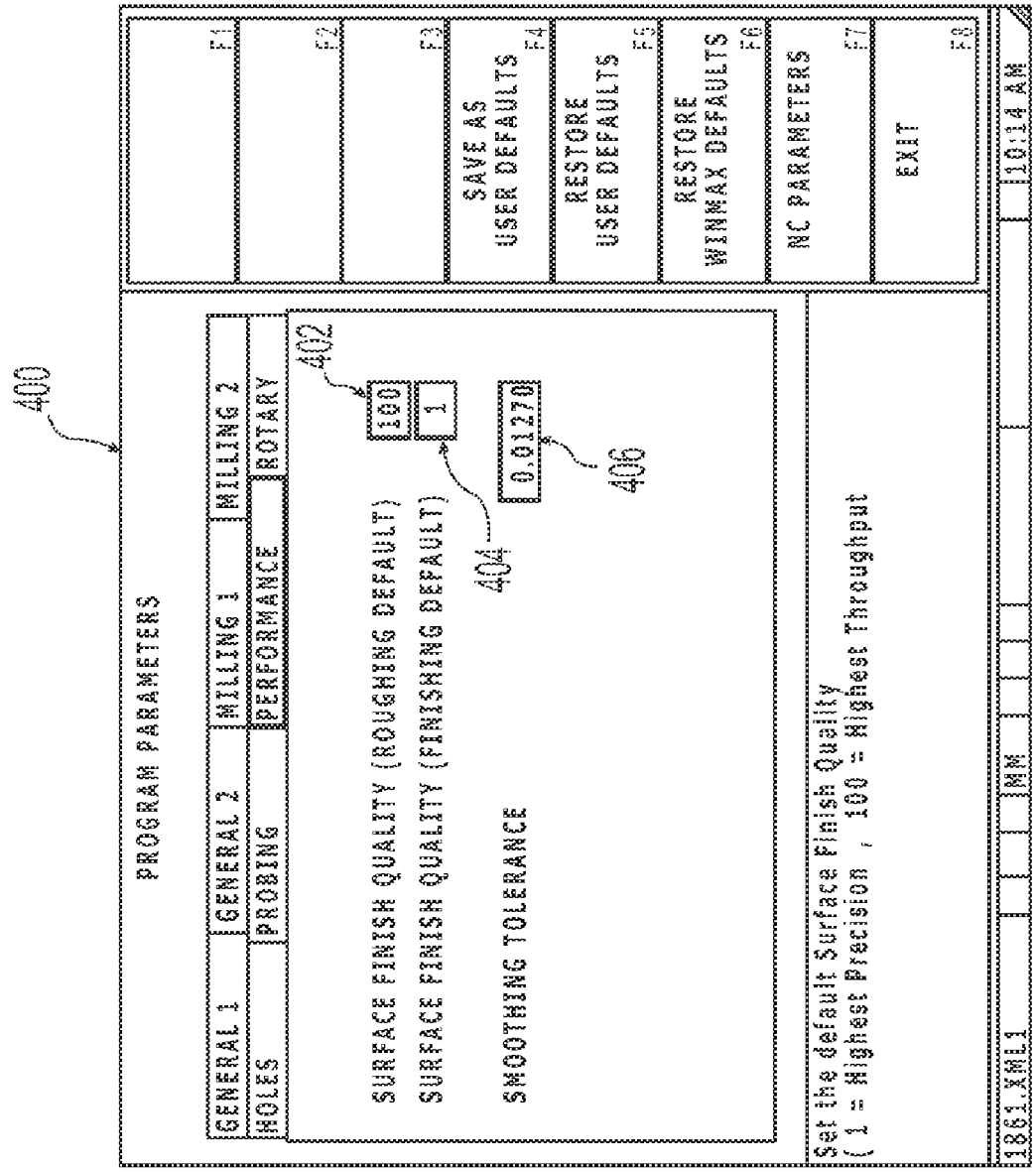
FIG. 12 illustrates an exemplary screen of a user interface wherein a first default parameter value of an SFQ parameter is specified for roughing operations and a second default parameter value of the SFQ parameter is specified for finishing operations.

The value of the smoothing tolerance parameter corresponds to the maximum distance that the internal position data can deviate from the original tool path. The larger the tolerance value, the more flexibility the trajectory generation component 108 has in smoothing out the tool path. However, the value of the smoothing tolerance parameter should not be so large as to cause the trajectory generation component 108 to lose the intended geometry of the part. This technology has the benefit of achieving smoother velocity, smoother acceleration, better feedrate control and improved surface finish. In one embodiment, the data smoothing of trajectory generation component 108 is controlled by two parameters; the smoothing enable parameter and the smoothing tolerance parameter. In one embodiment, the data smoothing of trajectory generation component 108 is controlled by a single parameter, the smoothing tolerance parameter. A zero value for the smoothing tolerance parameter results in the data smoothing of trajectory generation component 108 being disabled and the tool path being unmodified from the original part program. In one embodiment, the smoothing tolerance parameter value is in the range of 0.0002 inches to 0.0010 inches when not disabled. The smoothing tolerance parameter value may be specified by the user as illustrated in FIGS. 7, 8, and 12

Additional details about various techniques used by trajectory generation component 108 are provided in U.S. Provisional Patent Application Ser. No. 60/664,398, filed Mar. 23, 2005, titled "METHOD OF TRAJECTORY MOTION CONTROL,"; U.S. patent application Ser. No. 11/277,286, filed Mar. 23, 2006, titled "METHOD OF CURVATURE CONTROLLED DATA SMOOTHING,"; U.S. patent application Ser. No. 11/277,291, filed Mar. 23, 2006, titled "METHOD OF PERFORMING ADDITIVE LOOKAHEAD FOR ADAPTIVE CUTTING FEEDRATE CONTROL,"; and U.S. patent application Ser. No. 11/277,305, filed Mar. 23, 2006, titled "METHOD OF TOLERANCE-BASED TRAJECTORY PLANNING,", the disclosures each of which are expressly incorporated by reference herein.

Motion component 120 includes various elements such as motion control cards, servo drivers, encoders and other elements which move motion device 112 in a coordinated way. The hardware components, MEI/XMP motion board, Hurco RMB, Servo Drives and Encoders are used in the ULTIMAX brand system available from Hurco Companies, Inc. located at one Technology Way in Indianapolis, Ind.

Motion component 120 uses the position points, time information, and velocities provided by trajectory generation component 108 and information provided by surface finish algorithm component 106 in the movement of motion device 112 relative to the part through the movement of one or more of the axes of machine tool system 200. In one embodiment, motion component 120 controls a movement of motion device 112 to maintain a position of motion device 112 within a specified tolerance or tolerances from the position points provided by trajectory generation component 108. A tolerance based motion control system, including a method for setting feedrates based upon tolerance restraints, is disclosed in U.S. Pat. No. 6,242,880, the disclosure of which is expressly incorporated herein by reference.

Referring to FIG. 7, an exemplary screen 300 of user interface 103 is shown. Screen 300 of user interface 103 includes a selection input 302 whereby a user may specify a value for the SFQ parameter. As indicated by textual label 304, the SFQ parameter value specified through selection input 302 is the default value for the SFQ parameter. The default value is used in the absence of another value.

Screen 300 of user interface 103 also includes a selection input 306 which corresponds to a value for the smoothing tolerance parameter for trajectory generation component 108 as indicated by textual label 308. In order to disable the smoothing tolerance feature, a zero value should be specified with selection input 306.

Referring to FIG. 8, an alternative screen 310 of user interface 103 is shown for specifying the default value for the SFQ parameter and the smoothing tolerance value. Screen 310 of user interface 103 includes a first selection input 312 through which the default value for the SFQ parameter is specified. Selection input 312 includes a first selection mode 314 wherein a user may fill-in the desired value for the SFQ parameter and a second selection mode 316 wherein a user drags a slider 318 to specify the desired value for the SFQ parameter.

Screen 310 of user interface 103 further includes a selection input 320 corresponding to the smoothing enable parameter. As shown in FIG. 8, selection input 320 is selected indicating that the smoothing enable parameter is disabled. Another selection input 324 is provided to specify a value for the smoothing tolerance parameter for trajectory generation component 108.

Figure 11:
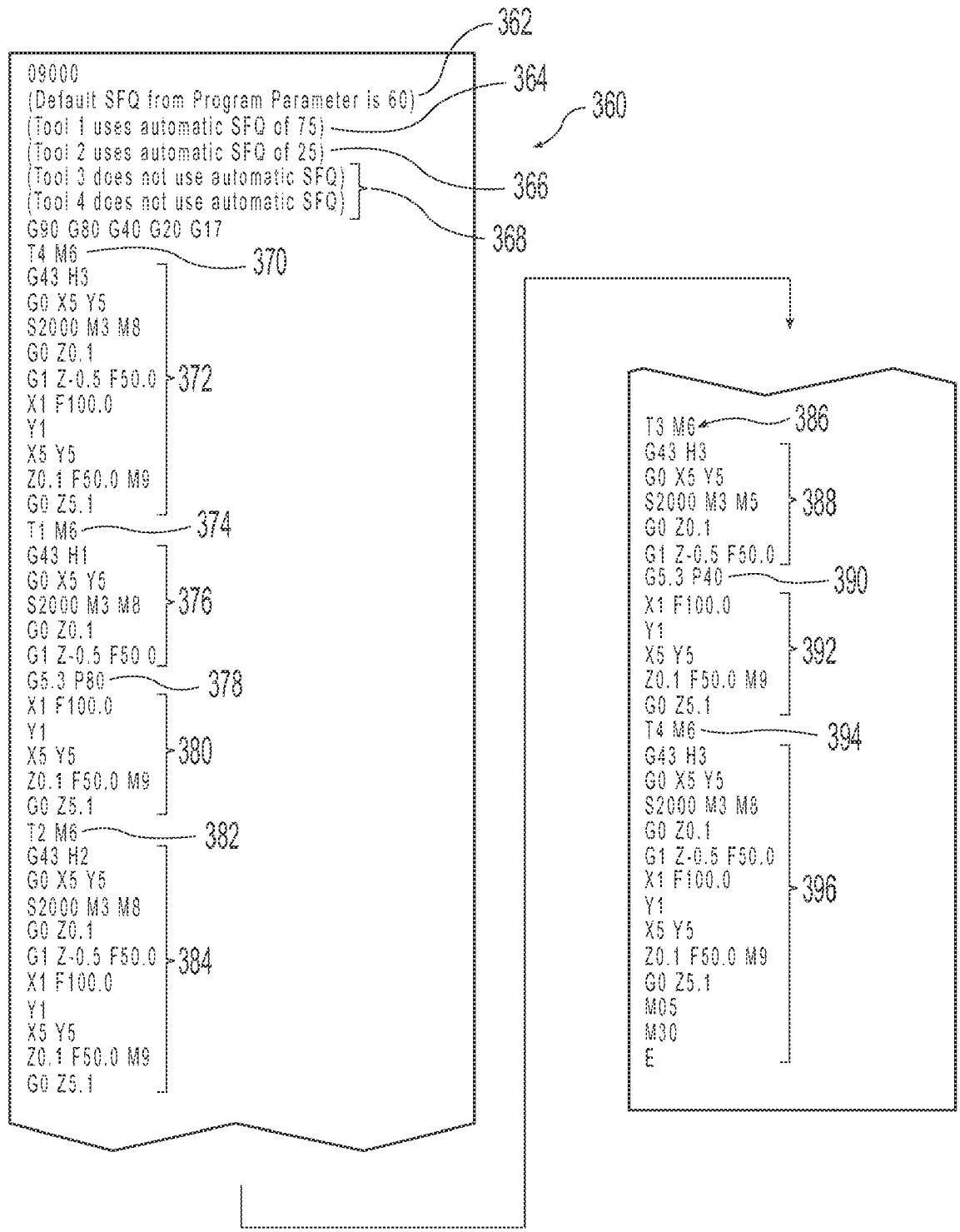
FIG. 11 illustrates an exemplary NC program.

The screens 300 and 310 of user interface 103 indicate the selection inputs for providing a default value for the SFQ parameter. Motion control system 100 may be operated in one of two modes of operation, a conversational mode of operation and an NC mode of operation. In the conversational mode of operation, a user during a programming session is presented with one or more screens of user interface 103 through which the user may program the desired geometry for the machined part and specify one or more values for the SFQ parameter. In one example, the user programs the desired geometry for the machined part by defining a plurality of operations with various motion devices 112 which result in the desired geometry of the machined part. In the NC mode of operation, an NC program is provided that includes instructions related to the desired geometry and one or more instructions specifying values for the SFQ parameter. In the case of an NC program, such as shown in FIG. 11, the default value for the SFQ parameter may be specified by a given code, illustratively a change parameter code G5.3. Both the conversational mode of operation and the NC mode of operation take into account the default value for the SFQ parameter and use that value in the absence of another specified value for the SFQ parameter.

Figure 9:
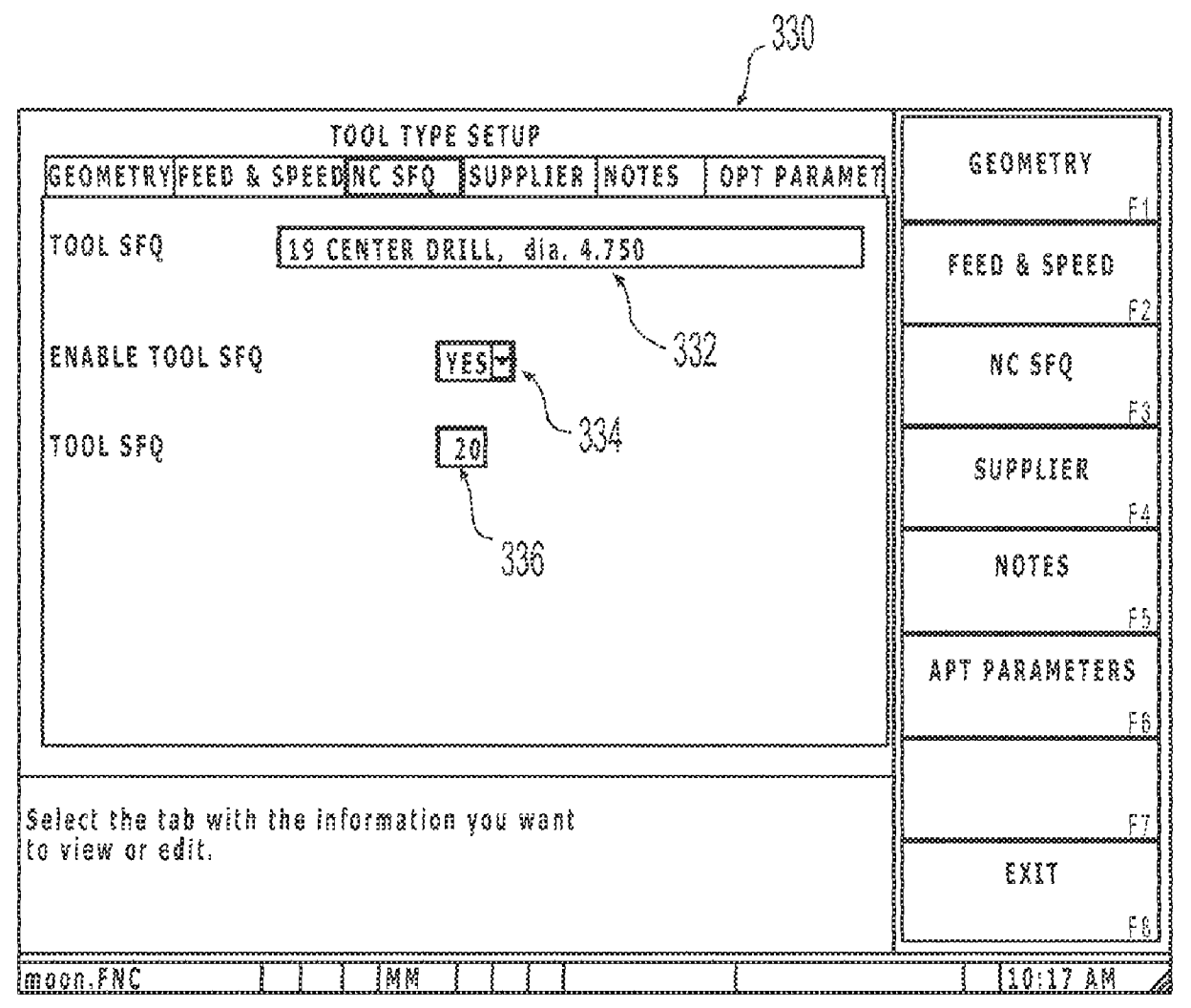

Further, both the conversational mode of operation and the NC mode of operation may use a value for the SFQ parameter specified for a given tool in a tool library when that tool is being used by machining center 200. Referring to FIG. 9, a tool setup screen 330 for interface 103 is shown. A name for the tool may be specified through selection input 332. The ability to specify a tool specific SFQ parameter value is provided through selection input 334. If "Enable G5.3 SFQ" is set to YES, the G5.3 SFQ value is automatically set when this tool is used. Illustratively, a tool specific SFQ parameter value is selected. A value for the SFQ parameter specific to the tool is specified through selection input 336. Illustratively, the value is set to 20. This value will be applied when a tool change to Tool 19 occurs. In one embodiment, different values for the SFQ parameter may be set for a tool depending on the operation type being performed by the tool. Exemplary operation types include roughing and finishing.

Figure 10:
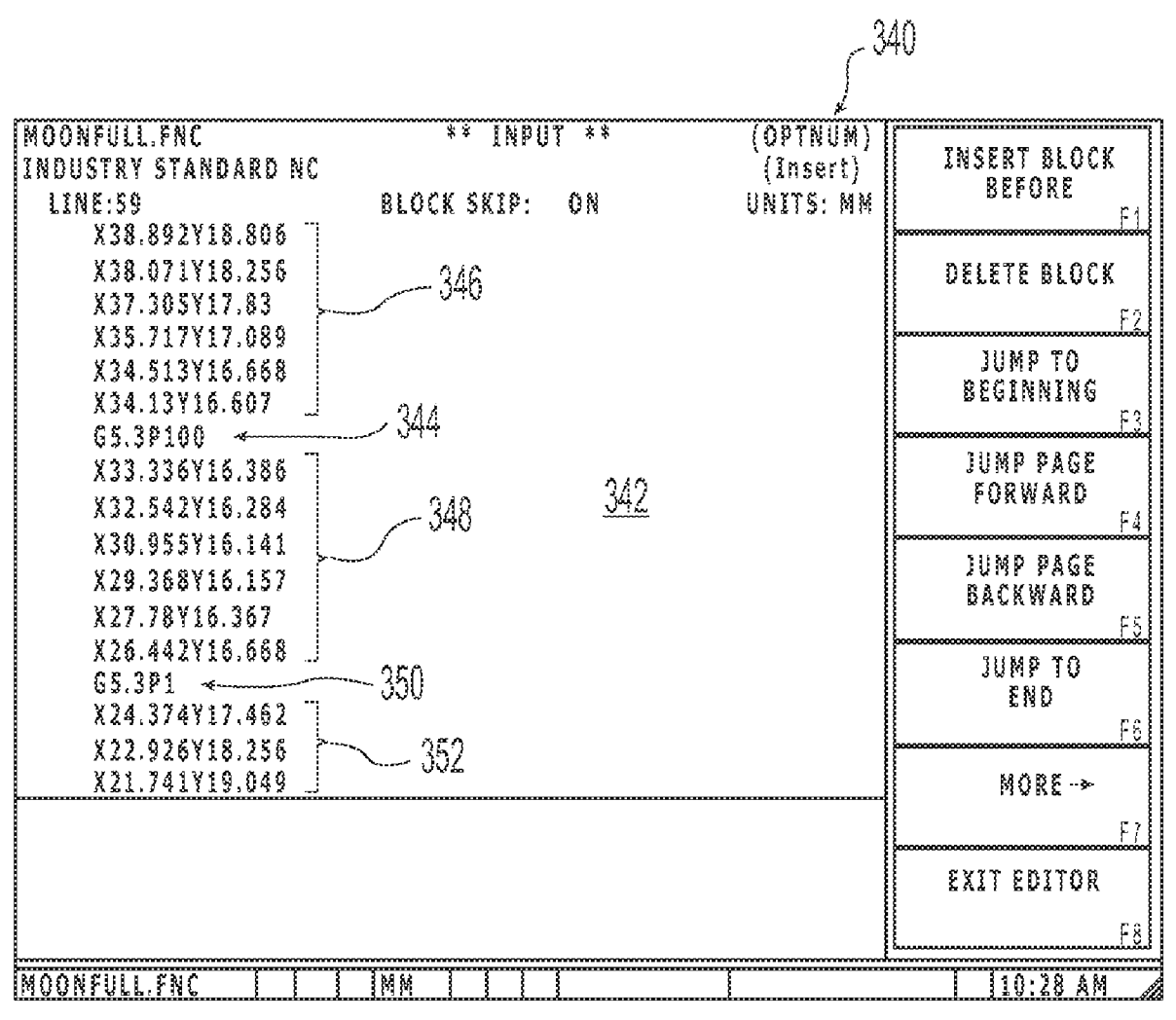

Referring to FIG. 10, a screen 340 of user interface 103 is shown wherein an NC program 342, programmed in the G&M code language, is being edited. In one embodiment, NC program 342 is loaded through user interface 103. A value for the SFQ parameter is set in the NC program through code 344, illustratively "G5.3P100." Code 344 sets the value of SFQ parameter to 100. As such, code section 346 will be associated with a prior value of SFQ parameter, such as the program default parameter, and code section 348 will be associated with a value of 100 for the SFQ parameter. Code 350 once again changes the value of the SFQ parameter, illustratively to 1. Code section 352 will be associated with a value of 1 for the SFQ parameter.

In one embodiment, a hierarchal system is used to determine the SFQ parameter value to use when multiple SFQ parameter values are provided. For instance, an overall or default SFQ parameter value of 70 may be specified along with a tool specific SFQ parameter value of 30 for a first tool. In this scenario, the overall SFQ parameter value is used unless the first tool is selected at which point the tool specific SFQ parameter value is used. Further, hierarchical examples are provided below in Table I.

Referring to Table I several scenarios are provided which illustrate the dominant value of the SFQ parameter at various instances.

TABLE I

NC Program SFQ priorities.

| Row | Event | Current Tool uses own SFQ? | New Tool uses own SFQ? | Last SFQ setting | SFQ setting |
|---|---|---|---|---|---|
| 1 | Start of Program | YES | — | None | Tool's SFQ |
| 2 | Start of Program | NO | — | None | Program Parameter |
| 3 | Tool Change | YES/NO | YES | Any | New tool's SFQ |
| 4 | Tool Change | NO | NO | None | Program Parameter |
| 5 | Tool Change | YES | NO | Old Tool's SFQ | Last G5.3 from program (or Program Parameter) |
| 6 | Tool Change | YES/NO | NO | G5.3 in program | G5.3 from program retained |
| 7 | G5.3 in program | YES/NO | — | Any | G5.3 from program |

The first two rows in Table I specify the value of the SFQ parameter at the start of the program. As indicated in the first row, if the current tool has an associated value for the SFQ parameter then the SFQ parameter is set to that value. As indicated in the second row, if the current tool does not have an associated value for the SFQ parameter then the SFQ parameter is set to the default value of the SFQ parameter specified as the program default value.

The third through sixth rows of Table I correspond to tool change transitions. As indicated in the third row, the new tool has a specified value for the SFQ parameter. In this situation, regardless of the previous value for the SFQ parameter, the SFQ parameter is set equal to the value specified for the new tool. As indicated in the fourth row, neither the current tool nor the new tool has an associated value for the SFQ parameter nor has a value for the SFQ parameter been set in the program listing, such as a G5.3 code. In this situation, the value of the SFQ parameter remains the default value of the SFQ parameter specified as the program default value.

As indicated in the fifth row, the current tool has a specified value for the SFQ parameter and the new tool does not have a specified value for the SFQ parameter. As such, the last SFQ parameter setting was the value associated with the previous tool. However, this value is specific to the previous tool. In this situation, the value for the SFQ parameter reverts to the last value of the SFQ parameter specified in the NC program with a command or the default value of the SFQ parameter specified as the program default value, if no value has been set through a program command.

As indicated in the sixth row, the current tool may or may not have a specified value for the SFQ parameter and the new tool does not have a specified value for the SFQ parameter. As such, the last SFQ parameter setting was the value of the previous tool or if none was specified, a value from a program command. In this situation, the value for the SFQ parameter reverts to the last value of the SFQ parameter specified in the NC program with a program command.

As indicated in the seventh row, a new value for the SFQ parameter is set through a program command. Regardless of whether the current tool has a specified value for the SFQ parameter or not, the value of the SFQ parameter from the program command controls.

Referring to FIG. 11, an exemplary NC program 360 is presented. As stated in comment line 362 the system default value for the SFQ parameter is set to a value of 60. Therefore, absent any changes the operations described in program 360 will be associated with an SFQ parameter value of 60. In comment line 364 it is indicated that Tool 1 has an associated SFQ parameter of 75. In comment line 366 it is indicated that Tool 2 has an associated SFQ parameter of 25. As indicated by the grouping of comment lines 368 that neither Tool 3 nor Tool 4 have a specified value for the SFQ parameter.

In line 370, Tool 4 is requested to be loaded into the spindle 220 of machine tool system 200. Referring back to comment line 368, Tool 4 does not have a specified value for the SFQ parameter. As such, the default program value for the SFQ parameter controls.

Lines 372 are then executed by machine tool system 200 with Tool 4. In line 374, Tool 1 is requested to be loaded into the spindle 220 of machine tool system 200 in place of Tool 4. As indicated in comment line 364, Tool 1 does have a specified value for the SFQ parameter. As such, lines 376 are executed by machine tool system 200 with the SFQ parameter value of 75 specified for Tool 1.

At line 378 a program change to the value of the SFQ parameter is provided. The value of the SFQ parameter is set to 80, even though the tool specified value of the SFQ parameter for Tool 1 is 75. As such, lines 380 are executed by machine tool system 200 with the SFQ parameter value of 80.

At line 382 another tool change is encountered. Tool 2 is requested to be loaded into the spindle 220 of machine tool system 200. As indicated in comment line 366, Tool 2 has a specified value for the SFQ parameter. As such, lines 384 are executed by machine tool system 200 with the SFQ parameter value of 25.

At line 386 another tool change is encountered. Tool 3 is requested to be loaded into the spindle 220 of machine tool system 200. As indicated in comment lines 368, Tool 3 does not have a specified value for the SFQ parameter. As such, lines 388 are executed by machine tool system 200 with the SFQ parameter value of 80 (the last program command value for the SFQ parameter value in line 378).

At line 390 a program change to the value of the SFQ parameter is provided. The value of the SFQ parameter is set to 40. As such, lines 392 are executed by machine tool system 200 with the SFQ parameter value of 40.

At line 394 another tool change is encountered. Tool 4 is requested to be loaded into the spindle 220 of machine tool system 200. As indicated in comment lines 368, Tool 4 does not have a specified value for the SFQ parameter. As such, lines 396 are executed by machine tool system 200 with the SFQ parameter value of 40 (the last program command value for the SFQ parameter value in line 390).

In one embodiment, a user may specify multiple program default values for the SFQ parameter. Referring to FIG. 12, in one example of a programming session in the conversational mode of operation, screen 400 is presented wherein a first SFQ parameter value for a roughing operation may be selected through selection input 402 and a second SFQ parameter value for a finishing operation may be selected through selection input 404. A selection input 406 is also provided for specifying a value for the smoothing tolerance for trajectory generation component 108.

In a further example, a user may specify a first SFQ parameter value for a first tool and a second SFQ parameter value for a second tool. Further, each of said first tool and said second tool may each have multiple SFQ parameter values depending on the operation to be performed, such as roughing or finishing. In yet a further example, a user may specify a first SFQ parameter value for a given feature of the geometry, such as a surface.

Figure 13:
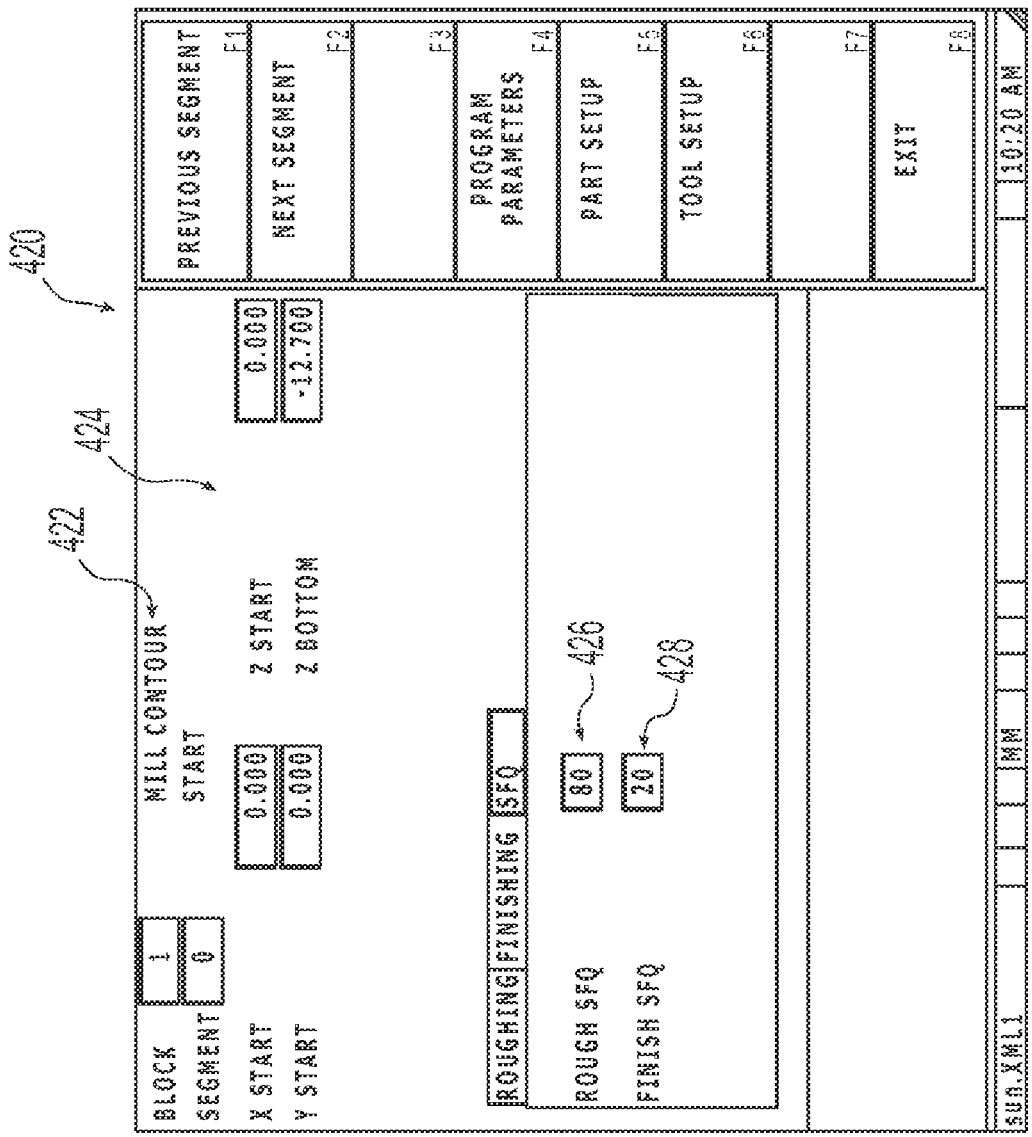
FIG. 13 illustrates an exemplary screen of a user interface of a block of a conversational program wherein a first SFQ parameter value is specified for roughing operations and a second SFQ parameter value is specified for finishing operations.

A separate SFQ value may be set for each available operation (Roughing, Finishing) in a milling block, a rotary block (contour, circle, frame), and other suitable blocks selected in a conversational mode of operation. An example of this is shown in screen 420 of user interface 103 in FIG. 13. In FIG. 13, a mill contour operation block is being defined in a programming session in the conversational mode of operation as indicated by textual label 422. The geometrical parameters are provided in selection inputs 424. A value for the SFQ parameter for roughing operations in the mill contour block is specified with selection input 426. A value for the SFQ parameter for finishing operations in the mill contour block is specified with selection input 428.

A swept surface operation in the conversational mode of operation also has separate SFQ for pocket roughing and finishing when it is set as a pocket boundary. With the swept surface function, a user may define a two-dimensional surface and then sweep that surface along a contour, creating complex three-dimensional geometries within one conversational data block. In one example, a user may define a surface for the walls of a pocket.

The conversational mode of operation also has a change parameter block. The change parameter block changes the SFQ parameter value for any new blocks created after it.

Figure 14:
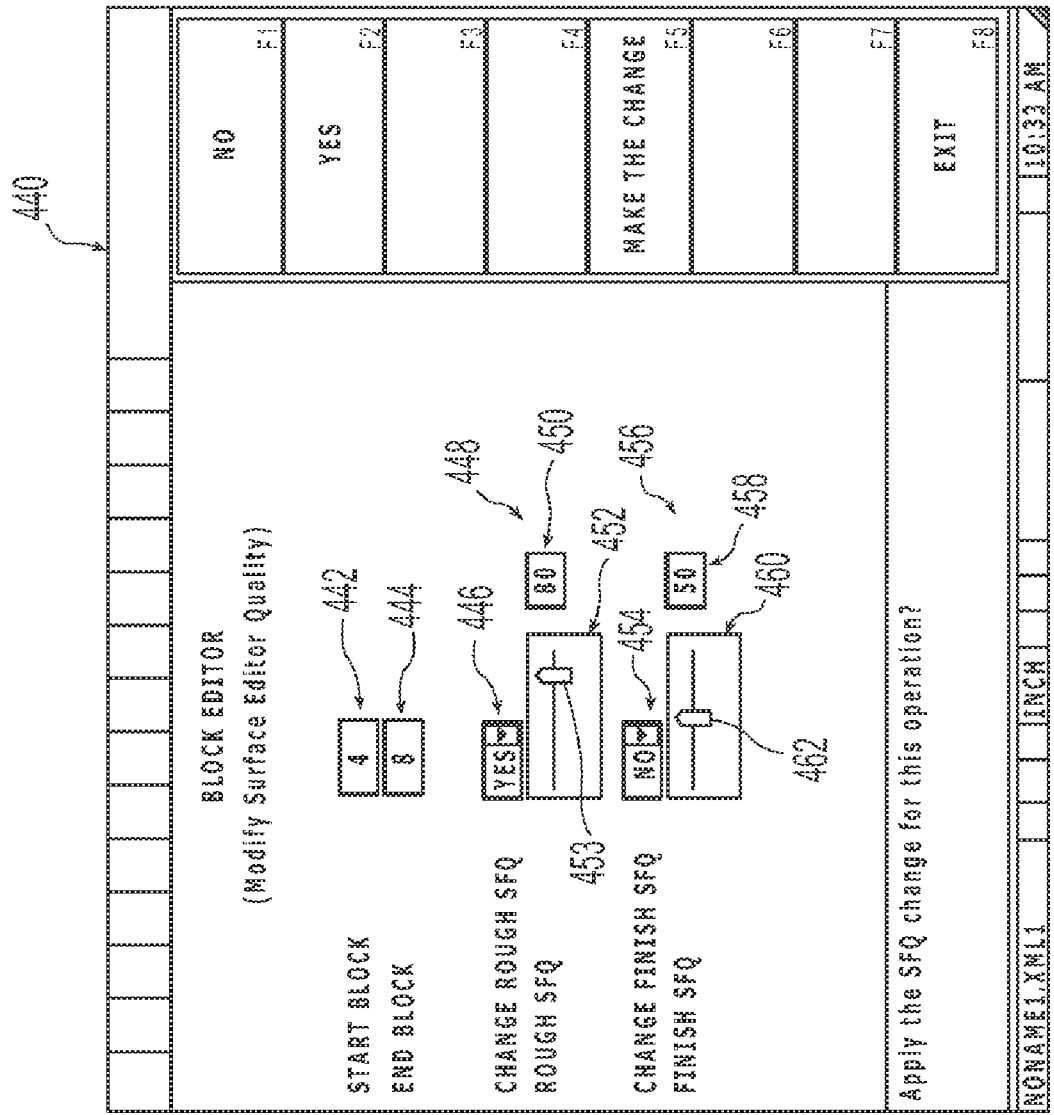
FIG. 14 illustrates an exemplary screen of a user interface wherein a first value of an SFQ parameter is specified for roughing operations for a range of blocks in a conversational program and a second value of the SFQ parameter is specified for finishing operations for a range of blocks in a conversational program.

A new SFQ can be set for the roughing and finishing operations in multiple consecutive blocks of a program in the conversational mode of operation from the Change Surface Finish Quality screen 440 shown in FIG. 14. As shown in FIG. 14, a selection input 442 is provided to specify a start block and a selection input 444 is provided to specify an end block. Illustratively, all blocks starting with block 4 and ending with block 8 will be altered.

A selection input 446 is provided on screen 440 whereby a user may select to change the roughing SFQ parameter value for the blocks selected with selection inputs 442 and 444. If "Yes" is selected with selection input 446 then selection input 448 is activated wherein a user may specify a new value for the SFQ parameter. Selection input 448 includes a first selection mode 450 wherein a user may fill-in the desired value for the SFQ parameter and a second selection mode 452 wherein a user drags a slider 453 to specify the desired value for the SFQ parameter. In one embodiment, only selection mode 450 is presented.

A selection input 454 is provided on screen 440 whereby a user may select to change the finishing SFQ parameter value for the blocks selected with selection inputs 442 444. If "Yes" is selected with selection input 454 then selection input 456 is activated wherein a user may specify a new value for the SFQ parameter. Selection input 456 includes a first selection mode 458 wherein a user may fill-in the desired value for the SFQ parameter and a second selection mode 460 wherein a user drags a slider 462 to specify the desired value for the SFQ parameter. In one embodiment, only selection mode 458 is presented.

In the example shown in FIG. 14, the roughing SFQ parameter value for blocks 4 to 8 is changed to a value of 80 and the finishing SFQ parameter value for blocks 4 to 8 remains the same.

A user may specify values for the SFQ parameter values in many different ways. In one embodiment, the values for the SFQ parameter are provided through a user interface. In another embodiment, the values for the surface finish parameter are provided as part of a part program received by motion control system 100, such as over a network.

Figures 15A, 15B:
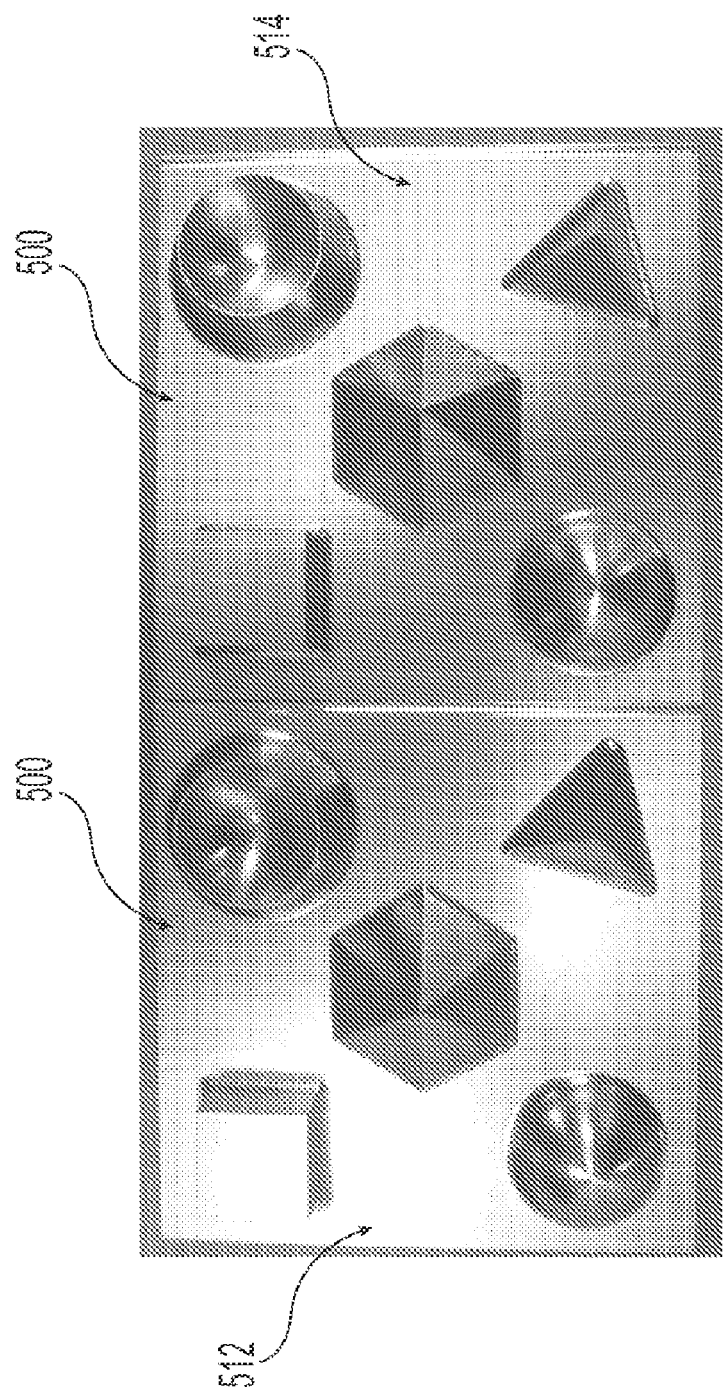
FIGS. 15A and 15B illustrate two parts machined with differing values for the SFQ parameter.

Various examples of geometry machined by motion system 100 are shown in U.S. Provisional Application Ser. No. 60/821,513, filed on Aug. 4, 2006, titled "SYSTEM AND METHOD FOR SURFACE FINISH MANAGEMENT." An example is provided herein in FIGS. 15A and 15B which shows two instances 512 and 514, respectively, of part 500. Instance 512 was machined with an SFQ value of 100 during roughing operations and an SFQ value of 50 during finishing operations. The run time for completing instance 512 was 2 hours, 49 minutes, and 13 seconds. Instance 514 was machined with an SFQ value of 50 during roughing operations and an SFQ value of 50 during finishing operations. The run time for completing instance 514 was 3 hours, 41 minutes, and 13 seconds. As shown in FIGS. 15A and 15B, instances 512 and 514 have generally similar surface finishes. However, by increasing the SFQ parameter value during roughing operations, motion device 112 was able to be moved relative to the part at a higher velocity and the time required to machine instance 512 was about 1 hour less than the time required to machine instance 514.

The source code appendix of U.S. Provisional Application Ser. No. 60/821,513, which is expressly incorporated by reference herein, contains an exemplary embodiment.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for controlling a machine tool system to machine a part, the method comprising the steps of:
   providing a motion control system having a conversational mode of operation and a numerical control ("NC") mode of operation;
   setting a default surface finish quality ("SFQ") value;
   determining, based on the default SFQ value, a default set of values for a plurality of system parameters of the motion control system for controlling a movement along a first axis of the machine tool system from a first set of values of the plurality of parameters of the motion control system associated with a first SFQ value and a second set of values of the plurality of parameters of the motion control system associated with a second SFQ value;
   receiving a desired geometry for the part through one of the conversational mode of operation and the NC mode of operation, wherein in the conversational mode of operation during a programming session a plurality of machining operations are defined using one or more motion devices which result in the desired geometry for the part and at least one SFQ value which is received during the programming session through a user interface, the at least one SFQ value being assigned to at least one of the plurality of machining operations; and
   moving the machine tool system based on the default set of values of the plurality of parameters of the motion control system to perform at least a first operation during machining of the part.

2. The method of claim 1, further comprising the steps of:
   receiving a third SFQ value;
   determining a third set of values of the plurality of parameters of the motion control system for controlling the movement along the first axis of the machine tool system based on the third SFQ value from the first set of values of the plurality of parameters of the motion control system associated with the first SFQ value and the second set of values of the plurality of parameters of the motion control system associated with the second SFQ value; and
   moving the machine tool based on the third set of values of the plurality of parameters of the motion control system to perform at least a second operation during machining of the part.

3. The method of claim 2, wherein the desired geometry is received as an NC program in the NC mode of operation and the third SFQ value is specified in the NC program as a code in the NC program, the step of determining the third set of values of the plurality of parameters of the motion control system for controlling the movement along the first axis of the machine tool system based on the third SFQ value being performed subsequent to reading the third SFQ value from the NC program.

4. The method of claim 2, wherein the desired geometry is received as an NC program in the NC mode of operation and the third SFQ value is associated with a first tool identified in the NC program.

5. The method of claim 2, wherein the desired geometry is received through the programming session in the conversational mode of operation and the third SFQ value is specified during the programming session.

6. The method of claim 5, wherein the third SFQ value is associated with a first portion of the plurality of operations.

7. The method of claim 5, wherein the third SFQ value is associated with a roughing operation and a fourth SFQ value is associated with a finishing operation.

8. The method of claim 5, wherein the third SFQ value is associated with a first tool selected during the programming session.

9. The method of claim 5, wherein the third SFQ value is associated with a first tool selected during the programming session and a fourth SFQ value is associated with a second tool selected during the programming session.

10. The method of claim 9, further comprising the steps of:
    selecting the first tool;
    assigning the third SFQ value for subsequent operations using the first tool;
    selecting a third tool which does not include an associated SFQ value;
    reverting back to the default SFQ value for subsequent operations using the third tool.

11. The method of claim 1, wherein the step of determining the default set of values of the plurality of parameters of the motion control system for controlling the movement of the machine tool system based on the default SFQ value includes the steps of:
    establishing for each parameter of the plurality of parameters a surface finish quality curve which has a first point corresponding to the first SFQ value and a first value of the corresponding parameter of the plurality of parameters of the motion control system and a second point corresponding to the second SFQ value and a second value of the corresponding parameter of the plurality of parameters of the motion control system; and
    assigning values to each of the default set of values for the plurality of parameters by interpolating the respective surface finish quality curve.

12. The method of claim 11, wherein each of the surface finish quality curves are lines and the interpolation is a linear interpolation.

13. The method of claim 1, wherein a first machining operation is to be performed with a first tool; further comprising the steps of:
    determining if the first tool has an associated first tool SFQ value; and
    moving the machine tool system during the first machining operation (a) based on the default SFQ value when the first tool does not have an associated first tool SFQ value and (b) based on the first tool SFQ value when the first tool has an associated first tool SFQ value.

14. The method of claim 13, wherein a second machining operation is to be performed with a second tool; further comprising the steps of:
    determining if the second tool has an associated second tool SFQ value; and
    moving the machine tool system during the second machining operation (a) based on the default SFQ value when the second tool does not have an associated second tool SFQ value and (b) based on the second tool SFQ value when the second tool has an associated second tool SFQ value.

15. The method of claim 13, wherein the associated first tool SFQ value is provided in a tool library which is modifiable through a user interface of the machine tool system.

16. The method of claim 1, wherein a first machining operation is to be performed with a first tool; further comprising the steps of:
    receiving a first SFQ value prior to commencement of the first machining operation;
    moving the machine tool system during the first machining operation based on the first SFQ value when the first tool does not have an associated first tool SFQ value and based on the first tool SFQ value when the first tool has an associated first tool SFQ value.

17. The method of claim 1, wherein the at least one SFQ value is different from the default SFQ value.

18. A method for controlling the movement of a machine tool system to machine a part, the method comprising the steps of:
    associating a first set of values of a plurality of parameters of a motion control system with a first value of a surface finish quality ("SFQ") parameter, the SFQ parameter having a range of possible values;
    associating a second set of values of the plurality of parameters of the motion control system with a second value of the SFQ parameter;
    receiving a first desired value of the SFQ parameter through a fill-in input in a user interface;
    determining a third set of values of the plurality of parameters of the motion control system for controlling the movement of the machine tool system based on the first desired value of the SFQ parameter from the first set of values of the plurality of parameters of the motion control system associated with the first value of the SFQ parameter and the second set of values of the plurality of parameters of the motion control system associated with the second value of the SFQ parameter;
    moving the machine tool system based on the third set of values of the plurality of parameters of the motion control system to perform at least a first operation during machining of the part;
    receiving a second desired value of the SFQ parameter;
    determining a fourth set of values of the plurality of parameters of the motion control system for controlling the movement of the machine tool based on the second desired value of the SFQ parameter from the first set of values of the plurality of parameters of the motion control system associated with the first value of the SFQ parameter and the second set of values of the plurality of parameters of the motion control system associated with the second value of the SFQ parameter; and
    moving the machine tool system based on the fourth set of values of the plurality of parameters of the motion control system to perform at least a second operation during the machining of the part.

19. The method of claim 18, wherein the first value corresponds to a first end of the range of possible values of the SFQ parameter and the second value corresponds to a second end of the range of possible values of the SFQ parameter.

20. The method of claim 19, wherein the first set of values of the plurality of parameters and the second set of values of the plurality of parameters are specified by the step of inputting the first set of values of the plurality of parameters and the second set of values of the plurality of parameters through a user interface.

21. The method of claim 18, wherein the step of determining the third set of values of the plurality of parameters of the motion control system for controlling the movement of the machine tool system based on the first desired value of the SFQ parameter includes the steps of:
    establishing for each parameter of the plurality of parameters a surface finish quality curve which has a first point corresponding to the first value of the SFQ parameter and a first value of the corresponding parameter of the plurality of parameters of the motion control system and a second point corresponding to the second value of the SFQ parameter and a second value of the corresponding parameter of the plurality of parameters of the motion control system; and assigning values to each of the third set of values for the plurality of parameters by interpolating the respective surface finish quality curve.

22. The method of claim 21, wherein the surface finish quality curves are lines.

23. The method of claim 18, wherein the second desired value of the SFQ parameter corresponds to a tool specific surface finish.

24. The method of claim 18, wherein the second desired value of the SFQ parameter corresponds to a first operation type.

25. The method of claim 24, wherein the operation type is one of a roughing operation and a finishing operation.

26. The method of claim 18, wherein the second desired value of the SFQ parameter corresponds to a feature specific surface finish.

27. A method for controlling the movement of a machine tool system to machine a part, the method comprising the steps of:

determining a first set of values of the plurality of parameters for controlling the movement of the machine tool system based on a first value of a surface finish quality ("SFQ") parameter, the SFQ parameter having a range of possible values;

performing at least a first operation with a first tool based on the first set of values of the plurality of parameters;

replacing the first tool with a second tool, the second tool having a second value of the SFQ parameter associated therewith;

determining a second set of values of the plurality of parameters for controlling the movement of the machine tool system based on the second value of the SFQ parameter;

performing at least a second operation with the second tool based on the second set of values for the plurality of parameters;

specifying a third value of the SFQ parameter prior to a third operation with the second tool;

determining a third set of values of the plurality of parameters for controlling the movement of the machine tool system based on the third value of the SFQ parameter; and performing the third operation with the second tool based on the third set of values for the plurality of parameters.

28. The method of claim 27, wherein the step of determining the first set of values of the plurality of parameters of the motion control system for controlling the movement of the machine tool based on the first value of the SFQ parameter includes the steps of:

establishing for each parameter of the plurality of parameters a surface finish quality curve which has a first point corresponding to a third value of the SFQ parameter and a third value of the corresponding parameter of the plurality of parameters of the motion control system and a fourth point corresponding to a fourth value of the SFQ parameter and a fourth value of the corresponding parameter of the plurality of parameters of the motion control system; and assigning values to each of the first set of values for the plurality of parameters by interpolating the respective surface finish quality curve.

29. The method of claim 28, wherein each of the surface finish quality curves are lines.

30. The method of claim 27, wherein the first value of the SFQ parameter corresponds to a roughing operation and at least one of the second and third values of the SFQ parameter corresponds to a finishing operation.

31. The method of claim 27, further including the step of determining a maximum deviation from an intended travel path of at least one of the first tool and the second tool based on a smoothing tolerance parameter value which is modifiable through a user interface of the machine tool system.

32. The method of claim 27, further including the step of enabling a selection input of a user interface of the machine tool system, the specifying step including identifying the third value of the SFQ parameter with the selection input of the user interface.

33. An apparatus for machining a part with at least one tool, the apparatus comprising:

a frame;

a moveable support supported by and moveable relative to the frame, the moveable support supporting the part and having at least two moveable axes;

a machine tool spindle supported by the frame and moveable relative to the part, the machine tool spindle adapted to couple the at least one tool;

a motion control system operably coupled to the machine tool spindle and the moveable support, the motion control system executing the machining of the part through the controlled movement of the machine tool spindle and the moveable support; and a user interface including at least one display and at least one input member, the user interface operably coupled to the motion control system, wherein the motion control system receives a desired geometry through the user interface and at least one value of a surface finish quality ("SFQ") parameter through the user interface, the user interface having a conversational mode wherein an operator specifies the desired geometry and the at least one value of the surface finish quality parameter and a numerical control ("NC") mode wherein an NC program including the desired geometry and the at least one value of the SFQ parameter is supplied to the at least one input member, the motion control system determining at least one set of values for a plurality of parameters based on the at least one value of the SFQ parameter from at least two known sets of values of the plurality of parameters associated with at least two values of the SFQ parameter, the at least one set of values for the plurality of parameters being related to the controlled movement of both the at least two movable axes of the moveable support and the at least one axis of the machine tool spindle, wherein the range of SFQ parameter has a range of possible values, wherein the range of SFQ parameter values is a normalized range of potential values for each of the parameters of the plurality of parameters.

34. The apparatus of claim 33, wherein a value for each parameter of the plurality of parameters are determined by the motion control system through interpolation.

35. The apparatus of claim 33, wherein the at least one set of values for the plurality of parameters includes a first set of values and a second set of values, the first set of values for the plurality of parameters being related to a first operation during the machining of the part, the second set of values for the plurality of parameters being related to a second operation during the machining of the part.

36. The apparatus of claim 35, wherein the at least one value of the SFQ parameter includes a first value and a second value, the motion control system determining the first set of values for the plurality of parameters based on the first value of the SFQ parameter and the second set of values for the plurality of parameters based on the second value of the SFQ parameter.

37. A computer readable medium having computer-executable instructions for controlling the movement of a machine tool system to machine a part, said computer executable instructions comprising:
- a numerical control ("NC") program including a plurality of machining operations and a plurality of surface finish quality ("SFQ") parameters specified as a plurality of SFQ codes in the NC program;
- instructions to automatically determine for each one of the plurality of SFQ codes specified in the NC program a set of values of a plurality of parameters of a motion control system for controlling the movement of the machine tool system from a first set of values of the plurality of parameters of the motion control system associated with a first value of an SFQ parameter and a second set of values of the plurality of parameters of the motion control system associated with a second value of the SFQ parameter; and
- instructions to move the machine tool system based on a third set of values of the plurality of parameters of the motion control system to perform at least a first operation of the plurality of operations during the machining of the part, the third set of values being determined based on a first SFQ code in the NC program.

38. The computer readable medium of claim 37, further comprising the steps of:
- instructions to move the machine tool system based on a fourth set of values of the plurality of parameters of the motion control system to perform at least a second operation of the plurality of operations during the machining of the part, the fourth set of values being determined based on a second SFQ code in the NC program.

39. The computer readable medium of claim 38, wherein the NC program identifies a plurality of tools of the machine tool system, the first SFQ code being associated with a first tool identified by the NC program and the second SFQ code being associated with a second tool identified by the NC program.

40. A computer readable medium having computer-executable instructions for controlling the movement of a machine tool system to machine a part, said computer executable instructions comprising:
- instructions to automatically determine a first set of values of a plurality of parameters for controlling the movement of the machine tool system based on a first value of a surface finish quality ("SFQ") parameter, the SFQ parameter having a range of possible values;
- instructions to perform at least a first operation with a first tool based on the first set of values of the plurality of parameters;
- instructions to replace the first tool with a second tool, the second tool having a second value of the SFQ parameter associated therewith;
- instructions to automatically determine a second set of values of the plurality of parameters for controlling the movement of the machine tool system based on the second value of the SFQ parameter; and
- instructions to perform at least a second operation with the second tool based on the second set of values for the plurality of parameters,
- wherein the instructions to determine a first set of values of the plurality of parameters for controlling the movement of the machine tool system based on a first value of an SFQ parameter includes:
  - instructions to establish, for each parameter of the plurality of parameters, a surface finish quality curve which has a first point corresponding to a third value of the SFQ parameter and a third value of the corresponding parameter of the plurality of parameters of the machine tool system and a fourth point corresponding to a fourth value of the SFQ parameter and a fourth value of the corresponding parameter of the plurality of parameters of the motion control system; and
  - instructions to assign values to each of the first set of values for the plurality of parameters by interpolating the respective surface finish quality curve.

41. The computer readable medium of claim 40, wherein the first operation includes a roughing operation and the second operation includes a finishing operation.

\* \* \* \* \*